US012112187B2

(12) United States Patent
Birsan et al.

(10) Patent No.: US 12,112,187 B2
(45) Date of Patent: Oct. 8, 2024

(54) SCALABLE VISUALIZATION OF A CONTAINERIZED APPLICATION IN A MULTIPLE-CLUSTER ENVIRONMENT

(71) Applicant: Red Hat, Inc., Raleigh, NC (US)

(72) Inventors: Valentina Birsan, Markham (CA); Feng Xiang, Markham (CA); Jaclyn P. Wakin, Raleigh, NC (US); Laura Rodriguez, Raleigh, NC (US); Joshua Packer, Markham (CA)

(73) Assignee: Red Hat, Inc., Raleigh, NC (US)

( * ) Notice: Subject to any disclaimer, the term of this patent is extended or adjusted under 35 U.S.C. 154(b) by 96 days.

(21) Appl. No.: 17/107,355

(22) Filed: Nov. 30, 2020

(65) Prior Publication Data
US 2022/0171646 A1   Jun. 2, 2022

(51) Int. Cl.
*G06F 9/455* (2018.01)
*G06F 8/71* (2018.01)
(Continued)

(52) U.S. Cl.
CPC ........ *G06F 9/45558* (2013.01); *G06F 9/5077* (2013.01); *G06F 8/71* (2013.01);
(Continued)

(58) Field of Classification Search
CPC ............... G06F 9/45558; G06F 9/5077; G06F 2009/4557; G06F 2009/45591; G06F 8/71; G06F 9/451; G06F 9/455; G06F 9/5072
See application file for complete search history.

(56) References Cited

U.S. PATENT DOCUMENTS 8,479,098 B2 * 7/2013 Kimmet ................ H04L 47/829
715/736
8,516,477 B1 * 8/2013 Kearns ...................... G06F 8/65
717/176
(Continued)

FOREIGN PATENT DOCUMENTS

CN       107908521 A      4/2018
CN       110262944 A      9/2019
(Continued)

OTHER PUBLICATIONS

Maenhaut, Pieter-Jan, et al., "Resource Management in a Containerized Cloud: Status and Challenges," Journal of Network and Systems Management, Nov. 2019, 51 pages.
(Continued)

*Primary Examiner* — Michael W Ayers
(74) *Attorney, Agent, or Firm* — Dority & Manning, P.A.

(57) ABSTRACT

Scalable visualization of a containerized application in a multiple-cluster environment is disclosed. Deployment information that identifies a deployment status on a plurality of clusters of a set of resources that compose a containerized application is obtained. User interface imagery that identifies the set of resources, wherein each resource in the set is represented in the user interface imagery by only one corresponding resource representation, irrespective of a number of clusters on which the resource is deployed, is generated. A corresponding group deployment status indicator based on a deployment status of the resource on each cluster on which the resource was to be deployed is determined for at least one resource. The corresponding group deployment status indicator is included in association with the resource representation that corresponds to the resource. The user interface imagery is presented on a display device.

17 Claims, 18 Drawing Sheets

(51) Int. Cl.
*G06F 9/451* (2018.01)
*G06F 9/50* (2006.01)

(52) U.S. Cl.
CPC .............. *G06F 9/451* (2018.02); *G06F 9/455* (2013.01); *G06F 2009/4557* (2013.01); *G06F 2009/45591* (2013.01); *G06F 9/5072* (2013.01)

(56) References Cited

U.S. PATENT DOCUMENTS

| | | | |
|---|---|---|---|
| 9,043,786 | B1 | 5/2015 | Hodge et al. |
| 9,256,467 | B1* | 2/2016 | Singh .................... G06F 9/5005 |
| 9,319,286 | B2 | 4/2016 | Panuganty |
| 9,645,805 | B2 | 5/2017 | Govindaraju et al. |
| 9,645,858 | B2 | 5/2017 | Winterfeldt et al. |
| 9,727,439 | B2 | 8/2017 | Mohammed et al. |
| 9,805,322 | B2 | 10/2017 | Kelkar et al. |
| 10,284,685 | B2 | 5/2019 | Bauer et al. |
| 10,505,815 | B2 | 12/2019 | Padala et al. |
| 10,581,705 | B2 | 3/2020 | Patil et al. |
| 10,860,622 | B1* | 12/2020 | Florissi .................... G06F 16/22 |
| 10,868,742 | B2 | 12/2020 | Chitalia et al. |
| 11,323,327 | B1* | 5/2022 | Chitalia .............. H04L 41/0893 |
| 2015/0229532 | A1* | 8/2015 | Somaiya ................. H04L 41/40 715/736 |
| 2016/0182397 | A1* | 6/2016 | McFarlin ................... G06F 9/00 709/226 |
| 2016/0292578 | A1* | 10/2016 | Ashenfelter .......... G06F 16/248 |
| 2017/0339008 | A1 | 11/2017 | Dion et al. |
| 2018/0287902 | A1* | 10/2018 | Chitalia .................. G06F 21/41 |
| 2018/0349199 | A1 | 12/2018 | Vyas et al. |
| 2019/0066368 | A1 | 2/2019 | Paul et al. |
| 2019/0182101 | A1 | 6/2019 | Kulshreshtha et al. |
| 2020/0014607 | A1* | 1/2020 | Gangadhar ............. H04L 41/16 |
| 2020/0192651 | A1* | 6/2020 | Mudumbai ............. H04L 41/14 |
| 2020/0218580 | A1 | 7/2020 | Kim |
| 2020/0344124 | A1* | 10/2020 | Christober .......... H04L 41/0806 |
| 2020/0348984 | A1 | 11/2020 | Giannetti et al. |
| 2021/0200814 | A1* | 7/2021 | Tal .................... G06F 16/90335 |
| 2022/0164177 | A1* | 5/2022 | Walkes ............... G06F 9/45558 |

FOREIGN PATENT DOCUMENTS

| | | |
|---|---|---|
| WO | 2014145777 A1 | 9/2014 |
| WO | 2020017844 A1 | 1/2020 |

OTHER PUBLICATIONS

Muralidharan, Shapna, et al., "Monitoring and Managing IoT Applications in Smart Cities Using Kubernetes," Cloud Computing 2019 : The Tenth International Conference on Cloud Computing, GRIDs, and Virtualization, 2019, 7 pages.

Author Unknown, "Access Kubernetes Resources from the Azure Portal," Microsoft, Dec. 16, 2020, https://docs.microsoft.com/en-us/azure/aks/kubernetes-portal, 6 pages.

Author Unknown, "Application and Hybrid Application Resources," IBM Corporation, 2020, https://www.ibm.com/docs/en/cloud-paks/cp-management/2.2.x?topic=management-application-resources, 9 pages.

Author Unknown, "How to use the Pega Autonomic Event Services Enterprise Health console," Pegasystems Inc., Sep. 25, 2019, https://community.pega.com/knowledgebase/articles/pega-autonomic-event-services/how-use-pega-autonomic-event-services-enterprise-health-console, 24 pages.

Author Unknown, "Viewing application composition using the Topology view," Red Hat, Feb. 2020, https://docs.openshift.com/container-platform/4.2/applications/application_life_cycle_management/odc-viewing-application-composition-using-topology-view.html, 9 pages.

Author Unknown, "Web UI (Dashboard)," The Linux Foundation, May 12, 2021, https://kubernetes.io/docs/tasks/access-application-cluster/web-ui-dashboard/, 5 pages.

Calasanz, Rafael Tolosana, et al., "Towards the Scientific Cloud Workflow Architecture*," 5th International Workshop on ADVANCEs in ICT Infrastructures and Services (ADVANCE 2017), Jan. 2017, Evry, France, 11 pages.

Casperson, M., "Alternative Kubernetes Dashboards," Octopus Deploy, Sep. 22, 2020, https://octopus.com/blog/alternative-kubernetes-dashboards, 14 pages.

Haider, H., "The Ultimate Guide to the Kubernetes Dashboard: How to Install, Access, Authenticateand Add Heapster Metrics," replex, Apr. 19, 2019, https://www.replex.io/blog/how-to-install-access-and-add-heapster-metrics-to-the-kubernetes-dashboard, 15 pages.

Nguyen, Dinh Khoa, et al., "Blueprinting Approach in Support of Cloud Computing," Future Internet 2012, 4, 322-346; doi:10.3390/fi4010322, Mar. 21, 2012, 26 pages.

U.S. Appl. No. 17/082,725, filed Oct. 28, 2020.

Non-Final Office Action for U.S. Appl. No. 17/082,725, mailed Feb. 7, 2023, 22 pages.

Notice of Allowance and Notice of Allowability for U.S. Appl. No. 17/082,725, mailed Jul. 18, 2023, 26 pages.

* cited by examiner

SCALABLE VISUALIZATION OF A CONTAINERIZED APPLICATION IN A MULTIPLE-CLUSTER ENVIRONMENT

BACKGROUND

Container orchestration systems automate the deployment, scaling, and management of containerized applications among nodes in a cluster.

SUMMARY

The examples disclosed herein implement scalable visualization of a containerized application in a multiple-cluster environment.

In one example a method is provided. The method includes obtaining, by a computing device comprising a processor device, deployment information that identifies a deployment status on a plurality of clusters of a set of resources of a plurality of resources that compose a containerized application. The method further includes generating user interface imagery that identifies the set of resources, wherein each resource in the set is represented in the user interface imagery by only one corresponding resource representation, irrespective of a number of clusters on which the resource is deployed. The method further includes determining, for at least one resource, a corresponding group deployment status indicator based on a deployment status of the resource on each cluster in a group of clusters of the plurality of clusters on which the at least one resource was to be deployed. The method further includes including the corresponding group deployment status indicator in association with the resource representation that corresponds to the at least one resource. The method further includes presenting the user interface imagery on a display device.

In another example a computing device is provided. The computing device includes a memory and a processor device coupled to the memory. The processor device is to obtain deployment information that identifies a deployment status on a plurality of clusters of a set of resources of a plurality of resources that compose a containerized application. The processor device is further to generate user interface imagery that identifies the set of resources, wherein each resource in the set is represented in the user interface imagery by only one corresponding resource representation, irrespective of a number of clusters on which the resource is deployed. The processor device is further to determine, for at least one resource, a corresponding group deployment status indicator based on a deployment status of the resource on each cluster in a group of clusters of the plurality of clusters on which the at least one resource was to be deployed. The processor device is further to include the corresponding group deployment status indicator in association with the resource representation that corresponds to the at least one resource, and present the user interface imagery on a display device.

In another example a non-transitory computer-readable storage medium is provided. The non-transitory computer-readable storage medium includes executable instructions to cause a processor device to obtain deployment information that identifies a deployment status on a plurality of clusters of a set of resources of a plurality of resources that compose a containerized application. The instructions further cause the processor device to generate user interface imagery that identifies the set of resources, wherein each resource in the set is represented in the user interface imagery by only one corresponding resource representation, irrespective of a number of clusters on which the resource is deployed. The instructions further cause the processor device to determine, for at least one resource, a corresponding group deployment status indicator based on a deployment status of the resource on each cluster in a group of clusters of the plurality of clusters on which the at least one resource was to be deployed. The instructions further cause the processor device to include the corresponding group deployment status indicator in association with the resource representation that corresponds to the at least one resource, and present the user interface imagery on a display device.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
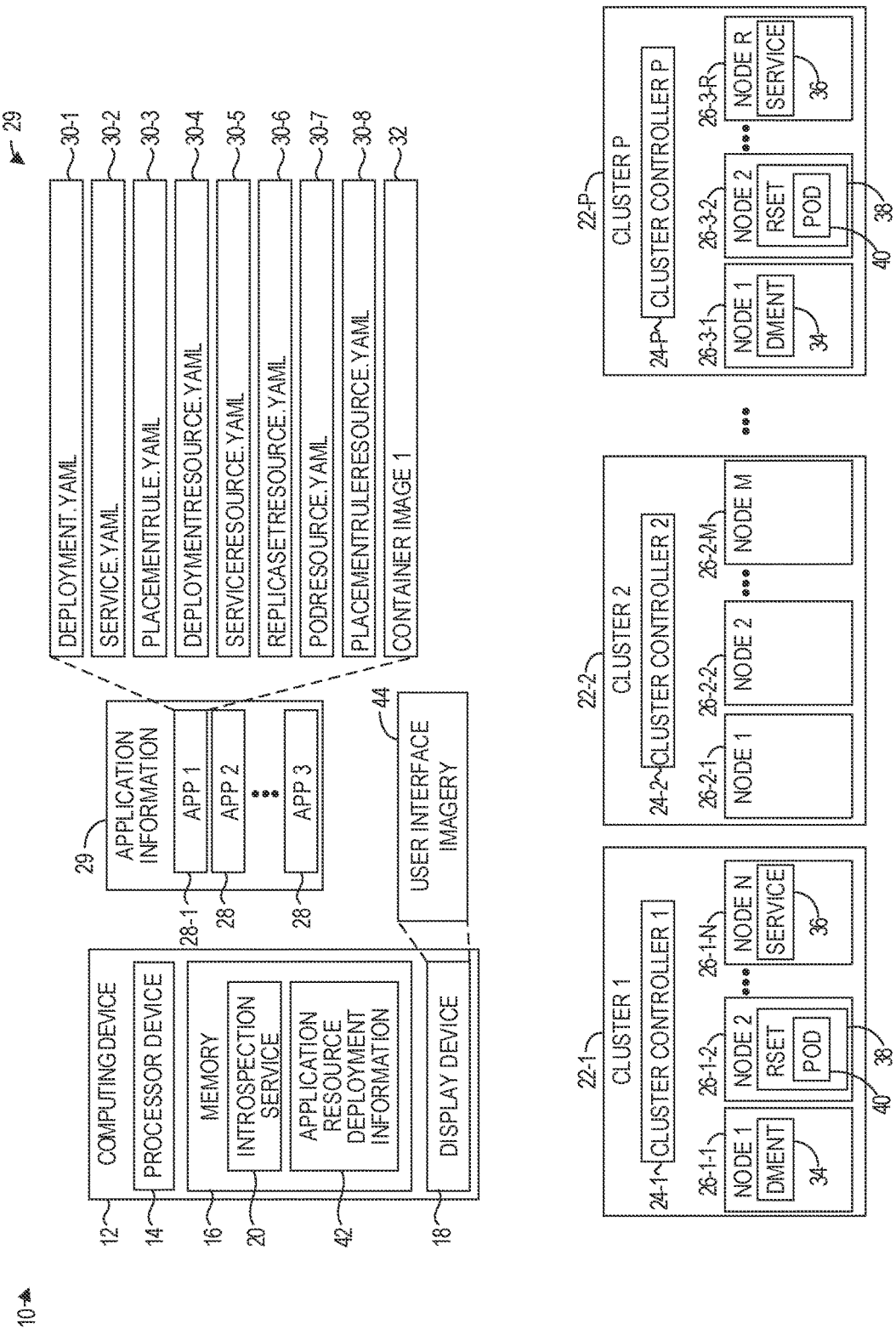
FIG. 1 is a block diagram of a runtime environment in which examples of introspection of a containerized application in a runtime environment can be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Container orchestration systems automate the deployment, scaling, and management of containerized applications among nodes in a cluster. A containerized application may include tens or hundreds of different containers and other resources, and each container or resource may have any number of instances distributed over many different nodes in a cluster. Increasingly, especially in conjunction with cloud computing environments, a containerized application may be distributed over many different nodes in several different clusters.

When there is a problem with a resource, such as the resource was not deployed on one or more clusters on which the resource was intended to be deployed, or the resource is in an error state on one or more of such clusters, it can be difficult for an operator to determine where the problem exists. The operator may need to enter multiple commands to multiple different cluster controllers in an attempt to locate a problem. This can be time-consuming and requires detailed knowledge of not only the resources that compose each containerized application, but knowledge of clusters on which such resources should be deployed. Consequently, it can take an operator a relatively long time to debug a deployment issue, and the services provided by the containerized application may be unavailable during this period of time, resulting in user dissatisfaction, an inability to process orders, or an inability to provide some other important business function.

The examples disclosed herein implement scalable visualization of a containerized application in a multiple-cluster environment. Deployment information is obtained that identifies a deployment status on a plurality of clusters of a set of resources of a plurality of resources that compose a containerized application. User interface imagery is generated that identifies the set of resources, such that each resource is represented in the user interface imagery by only one corresponding resource representation, irrespective of a number of clusters on which the resource is deployed. Group deployment status indicators may be presented in association with the resource representations to identify the deployment status of the resource on the clusters on which the resource was to be deployed.

The term "containerized application" as used herein refers to an application that comprises one or more container images, and is initiated and managed via a container orchestration system. When executed, a container image is initiated as a Linux® container, wherein the Linux® kernel features groups and namespaces are used to isolate processes from one another. A container image is often created from a containerization technology, such as, by way of non-limiting example, Docker®, or the like. The term "container orchestration system" refers to a system that automates the deployment, scaling and management of containerized applications among nodes in a cluster. The Kubernetes® container orchestration system (Kubernetes.io) is one example of a container orchestration system. The term "resource" as used herein refers to any individual component managed by the container orchestration system for which, if requested, the container orchestration system will return information specific to the resource. In the Kubernetes® container orchestration system, each resource of an application is typically defined in a YAML Ain't Markup Language (YAML) file and has a "kind" attribute (sometimes referred to herein as "type") and a "name" attribute.

The examples will be discussed herein in the context of the Kubernetes® container orchestration system and utilize terminology used in the Kubernetes® container orchestration system; however, the examples are applicable to any container orchestration system capable of deploying, scaling, and managing containerized applications among nodes in a cluster.

FIG. 1 is a block diagram of a runtime environment 10 in which examples of introspection of a containerized application in a runtime environment can be practiced. The runtime environment 10 includes a computing device 12, which in turn includes a processor device 14, a memory 16, and a display device 18. The memory 16 includes an introspection service 20. The introspection service 20, as will described in greater detail herein, implements introspection of a containerized application in a runtime environment. It is noted that while the introspection service 20 is a component of the computing device 12, functionality implemented by the introspection service 20 may be attributed to the computing device 12 generally. Moreover, in examples where the introspection service 20 comprises software instructions that program the processor device 14 to carry out functionality discussed herein, functionality implemented by the introspection service 20 may be attributed herein to the processor device 14. It is further noted that while the examples will be described as being implemented on the computing device 12 by the introspection service 20, it is apparent that the introspection service 20 could comprise a number of different components, some of which may execute concurrently on other computing devices.

The runtime environment 10 includes a plurality of clusters 22-1-22-P (generally, clusters 22). The cluster 22-1 includes a container orchestration system in the form of a cluster controller 24-1 that deploys, scales, and manages containerized applications by distributing resources across a plurality of nodes 26-1-1-26-1-N. The container orchestration system may comprise any suitable container orchestration system capable of deploying containerized application across a cluster of nodes. The term "deploy" as used herein refers to an installation and/or set up process of a resource on a cluster, but does not necessarily require that the resource be initiated and/or running. In some implementations, the container orchestration system comprises the Kubernetes® container orchestration system. While the container orchestration system, solely for purposes of illustration, is illustrated as a single component embodied in the cluster controller 24-1, in practice, the container orchestration system may be implemented by any number of modules, and may be in part distributed across the nodes 26-1-1-26-1-N. Each node 26-1-1-26-1-N may comprise a computing host (e.g., a bare metal machine), or a virtual machine. The cluster 22-2 includes a cluster controller 24-2 and a plurality of nodes 26-2-1-26-2-M, and the cluster 22-P includes a cluster controller 24-P and a plurality of nodes 26-3-1-26-3-R.

The runtime environment 10 includes a plurality of containerized applications 28-1, 28 (hereinafter "applications" for purposes of brevity) that can be deployed on one or more of the clusters 22. The application 28-1 includes application information 29 in the form of one or more YAML files 30-1-30-8, some of which define resources that will be used for the application 28-1, and one or more container images 32. As will be discussed in greater detail below with reference to FIG. 3, the YAML files 30-1-30-3 are pre-deployment YAML files, and the YAML files 30-4-30-8 are resource YAML files generated during deployment and that define resources that will provide functionality of the application 28-1.

In this example, the YAML file 30-4 defines a deployment (DMENT) resource 34 that has been deployed by the cluster controller 24-1 on the node 26-1-1 of the cluster 22-1, and that has also been deployed by the cluster controller 24-P on the node 26-3-1 of the cluster 22-P. The YAML file 30-5 defines a service resource 36 that has been deployed by the cluster controller 24-1 on the node 26-1-N of the cluster 22-1, and has also been deployed by the cluster controller 24-P on the node 26-3-R of the cluster 22-P. The YAML file 30-6 defines a replicaset (RSET) resource 38 that has been deployed by the cluster controller 24-1 on the node 26-1-2 of the cluster 22-1, and has also been deployed by the cluster controller 24-P on the node 26-3-2 of the cluster 22-P. The YAML file 30-7 defines a pod resource 40 that has been deployed by the cluster controller 24-1 on the node 26-1-2 of the cluster 22-1, and has also been deployed by the cluster controller 24-P on the node 26-3-2 of the cluster 22-P. The pod resources 40 include the container initiated from the container image 32. The YAML file 30-8 defines a placement rule resource that identifies the clusters 22-1 and 22-P as clusters 22 to which the application 28-1 is to be deployed.

The introspection service 20 is configured to access the application information 29 associated with the application 28-1 to identify the resources that compose the application 28-1. The introspection service 20 then requests from the cluster controllers 24-1 and 24-P deployment information for each of the resources. In response, the cluster controllers 24-1 and 24-P provide a deployment status for each of the resources, such as, by way of non-limiting example, deployed or not deployed. In some implementations, the introspection service 20 may generate, based on the application information 29 and the deployment information, application resource deployment information 42 that correlates the deployment information received from the cluster controllers 24-1 and 24-P with the resources of the application 28-1. The introspection service 20 may then generate and display user interface imagery 44 on the display device 18 that identifies at least some of the resources and the corresponding deployment status. In this manner, an operator can quickly and easily ascertain the deployment status of the application 28-1 across the clusters 22-1-22-P.

Figure 2:
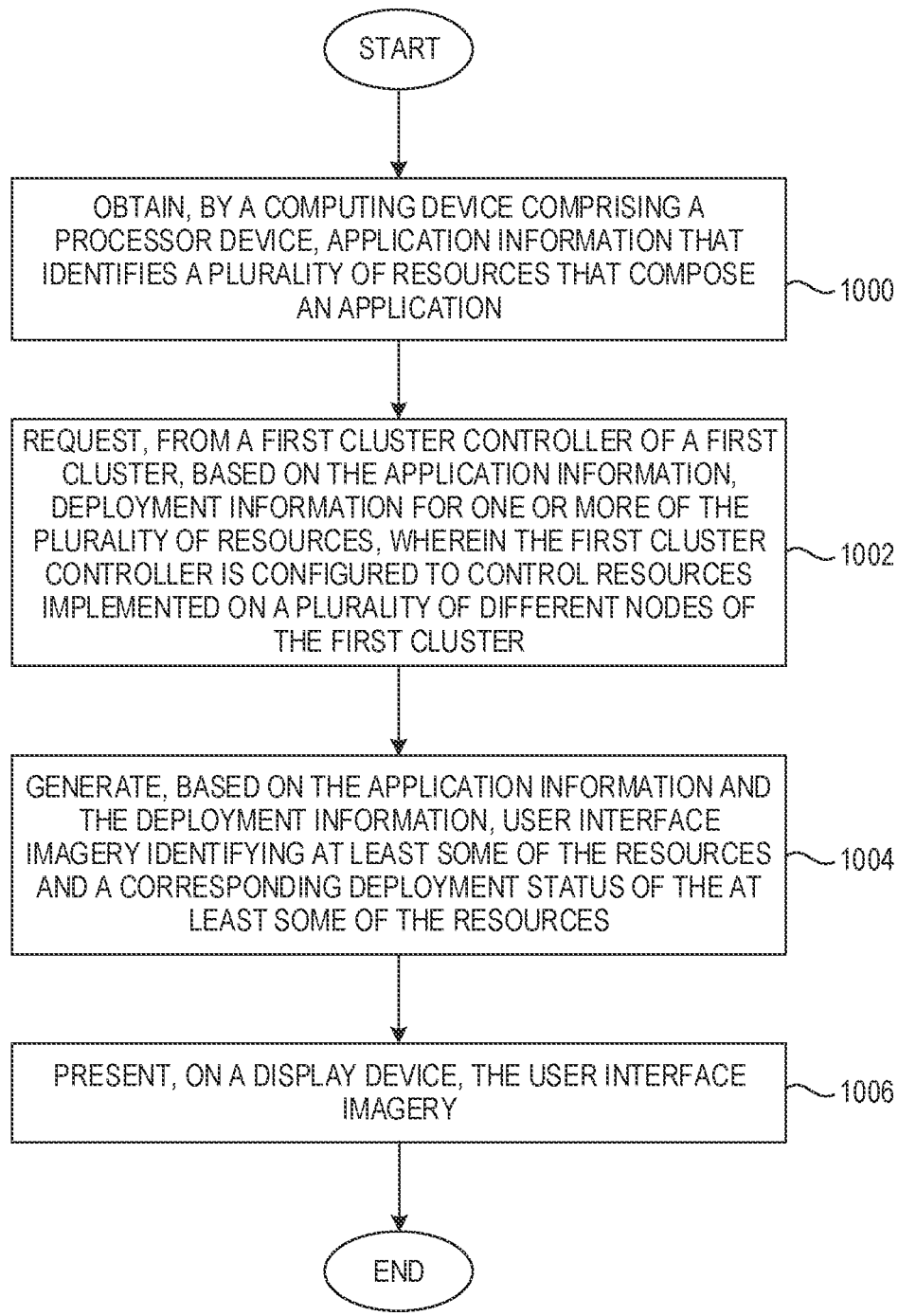
FIG. 2 is a flowchart of a method for introspection of an application in the runtime environment according to one example.

FIG. 2 is a flowchart of a method for introspection of the application 28-1 in the runtime environment 10 according to one implementation. FIG. 2 will be discussed in conjunction with FIG. 1. The computing device 12 obtains the application information 29 that identifies the plurality of resources 34, 36, 38, and 40 that compose the application 28-1 (FIG. 2, block 1000). The computing device 12 requests, from the cluster controller 24-1 of the cluster 22-1, based on the application information 29, deployment information for one or more of the plurality of resources 34, 36, 38, and 40, wherein the cluster controller 24-1 controls resources implemented on a plurality of different nodes 26-1-1-26-1-N of the cluster 22-1 (FIG. 2, block 1002). The computing device 12 generates, based on the application information 29 and the deployment information, the user interface imagery 44 identifying at least some of the resources 34, 36, 38, and 40 and a corresponding deployment status of the at least some of the resources 34, 36, 38, and 40 (FIG. 2, block 1004). The computing device 12 presents, on the display device 18, the user interface imagery 44 (FIG. 2, block 1006).

Figure 3:
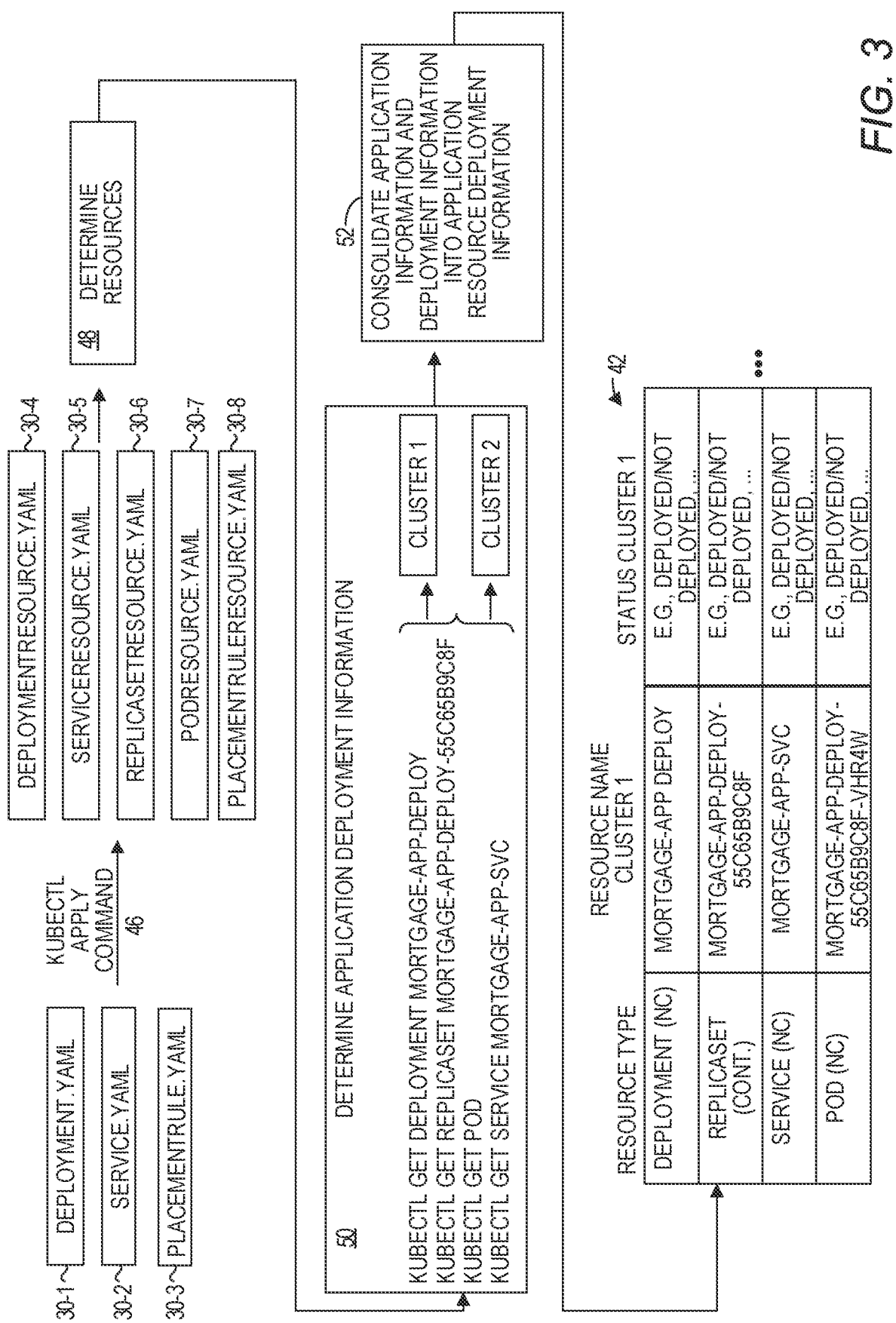
FIG. 3 is a block diagram illustrating a sequence of events that may occur in the runtime environment to implement the introspection of the application in the runtime environment according to one example.

FIG. 3 is a block diagram illustrating a sequence of events that may occur in the runtime environment 10 to implement the introspection of the application 28-1 in the runtime environment 10, according to one implementation. FIG. 3 will be discussed in conjunction with FIG. 1. The application 28-1 may initially comprise the container image 32 and the one or more pre-deployment YAML files 30-1-30-3. An operator, software engineer or other individual may generate the pre-deployment YAML files 30-1-30-3. The pre-deployment YAML files 30-1-30-3 define certain resources of the application 28-1, identify the container image 32 (in this example, "fxiang/mortgage:0.4.0"), and provide configuration information for the deployment of the application 28-1 on, in this implementation, the clusters 22-1 and 22-P.

An example of the YAML file 30-1 is provided below in Table 1.

TABLE 1

Deployment YAML

```
apiVersion: apps/v1
kind: Deployment
metadata:
    name: mortgage-app-deploy
    labels:
        app: mortgage-app-mortgage
spec:
    selector:
        matchLabels:
            app: mortgage-app-mortgage
    replicas: 1
    template:
        metadata:
            labels:
                app: mortgage-app-mortgage
        spec:
            containers:
            - name: mortgage-app-mortgage
              image: "fxiang/mortgage:0.4.0"
              imagePullPolicy: Always
              ports:
                - containerPort: 9080
              resources:
                limits:
                    cpu: 200m
                    memory: 256Mi
                request:
                    cpu: 200m
                    memory: 256Mi
```

An example of the YAML file 30-2 is provided below in Table 2.

TABLE 2

Service YAML

```
apiVersion: v1
kind: Service
metadata:
    name: mortgage-app-svc
    labels:
        app: mortgage-app-mortgage
spec:
    type: NodePort
    ports:
```

TABLE 2-continued

Service YAML

```
    - port: 9080
      targetPort: 9080
      protocol: TCP
  selector:
    app: mortgage-app-mortgage
```

An example of the YAML file 30-3 is provided below in Table 3.

TABLE 3

PlacementRule YAML

```
apiVersion: apps.open-cluster-management.io/v1
kind: PlacementRule
metadata:
  annotations:
    kubectl.kubernetes.io/last-applied-configuration: >
      {"apiVersion":"apps.open-cluster-
management.io/v1","kind":"PlacementRule","metadata":{"annotation
s":{ },"labels":{"app":"mortgage-app-mortgage"},"name":"mortgage-
app-
placement","namespace":"default"},"spec":{"clusterReplicas":1,
"clusterSelector":{"matchLabels":{"environment":"Dev"}}}}
    open-cluster-management.io/user-group:
c3lzdGVtOmNsdXN0ZXItYWRtaW5zLHN5c3RlbTphdXRoZW50aW
NhdGVk
    open-cluster-management.io/user-identity: a3ViZTphZG1pbg==
  creationTimestamp: '2020-10-25T15:55:27Z'
  generation: 3
  labels:
    app: mortgage-app-mortgage
  name: mortgage-app-placement
  namespace: default
  resourceVersion: '20615718'
  selfLink: >-
    /apis/apps.open-cluster-
management.io/v1/namespaces/default/placementrules/mortgage-
app-placement
  uid: 3dc15a83-04d7-4697-9bcb-036af514a218
spec:
  clusterReplicas: 2
  clusterSelector:
    matchLabels:
      vendor: OpenShift
status:
  decisions:
    - clusterName: cluster1
      clusterNamespace: cluster1
    - clusterName: cluster2
      clusterNamespace: cluster2
```

An operator may then issue one of more deployment commands 46 to start the deployment process. In this example, wherein the container orchestration system comprises the Kubernetes® container orchestration system, the deployment command 46 may comprise one or more KUBECTL APPLY commands that identify the YAML files 30-1-30-3. The deployment command(s) 46 causes the container orchestration system to generate the YAML files 30-4-30-8. Each of the YAML files 30-4-30-8 identify resources that will be used to implement functionality of the application 28-1. The container orchestration system then deploys, or attempts to deploy, the resources on the clusters 22-1 and 22-P.

The introspection service 20 may then be requested to determine the deployment status of the application 28-1. At block 48, the introspection service 20 accesses the YAML files 30-4-30-8 to identify the resources of the application 28-1. In this implementation, each of the YAML files 30-4-30-8 corresponds to a particular resource, and contains information about the corresponding resource, such as the name of the resource, the kind of the resource, and information relating to deploying the resource. The introspection service 20 parses the YAML files 30-4-30-8 to locate a value of a resource name variable to determine the name of each resource, and a resource kind variable to determine a resource kind of the resource. As an example, the YAML file 30-4 is reproduced below in Table 4.

TABLE 4

Deployment resource YAML

```
apiVersion: apps/v1
kind: Deployment
metadata:
  annotations:
    apps.open-cluster-management.io/hosting-deployable:
mortgage-ch/mortgage-channel-Deployment-mortgage-app-deploy
    apps.open-cluster-management.io/hosting-subscription:
default/mortgage-app-subscription
    apps.open-cluster-management.io/sync-source: subgbk8s-
default/mortgage-app-subscription
    deployment.kubernetes.io/revision: '1'
  creationTimestamp: '2020-10-13T16:15:18Z'
  generation: 4406
  labels:
    app: mortgage-app-mortgage
  name: mortgage-app-deploy
  namespace: default
  resourceVersion: '185438249'
  selfLink:
/apis/apps/v1/namespaces/default/deployments/mortgage-app-
deploy
  uid: e922dcf9-a053-42be-85c3-b0a2859f0765
spec:
  progressDeadlineSeconds: 600
  replicas: 1
  revisionHistoryLimit: 10
  selector:
    matchLabels:
      app: mortgage-app-mortgage
  strategy:
    rollingUpdate:
      maxSurge: 25%
      maxUnavailable: 25%
    type: RollingUpdate
  template:
    metadata:
      creationTimestamp: null
      labels:
        app: mortgage-app-mortgage
    spec:
      containers:
        - image: 'fxiang/mortgage:0.4.0'
          imagePullPolicy: Always
          name: mortgage-app-mortgage
          ports:
            - containerPort: 9080
              protocol: TCP
          resources:
            limits:
              cpu: 200m
              memory: 256Mi
          terminationMessagePath: /dev/termination-log
          terminationMessagePolicy: File
      dnsPolicy: ClusterFirst
      restartPolicy: Always
      schedulerName: default-scheduler
      securityContext: { }
      terminationGracePeriodSeconds: 30
```

The introspection service 20 parses the YAML file 30-4 to determine the value of the variable "metadata.name", in this example, "mortgage-app-deploy", which is the name of the resource that corresponds to the YAML file 30-4. The introspection service 20 also parses the YAML file 30-4 to determine the value of the resource kind variable (e.g., "kind"), in this example "Deployment". The introspection service 20 stores the resource name and resource kind. The introspection service 20 may also obtain the values of any other variables suitable for subsequent presentation to the operator on the display device 18, such as, by way of non-limiting example, metadata.namespace, or the like.

The YAML file 30-5 is reproduced below in Table 5.

TABLE 5

Service resource YAML apiVersion: v1
kind: Service
metadata:
   annotations:
      apps.open-cluster-management.io/hosting-deployable:
mortgage-ch/mortgage-channel-Service-mortgage-app-svc
      apps.open-cluster-management.io/hosting-subscription:
default/mortgage-app-subscription
      apps.open-cluster-management.io/sync-source: subgbk8s-
default/mortgage-app-subscription
   creationTimestamp: '2020-10-13T16:15:17Z'
   labels:
      app: mortgage-app-mortgage
   name: mortgage-app-svc
   namespace: default
   resourceVersion: '185443982'
   selfLink: /api/v1/namespaces/default/services/mortgage-app-svc
   uid: 1347e26b-c1b2-4d24-aa4a-771e00ed40b4
spec:
   clusterIP: 172.30.193.153
   externalTrafficPolicy: Cluster
   ports:
    - nodePort: 31054
      port: 9080
      protocol: TCP
      targetPort: 9080
   selector:
      app: mortgage-app-mortgage
   sessionAffinity: None
   type: NodePort The introspection service 20 parses the YAML file 30-5 to determine the value of the resource name variable "metadata.name", in this example, "mortgage-app-svc", which is the name of the resource that corresponds to the YAML file 30-5. The introspection service 20 also parses the YAML file 30-5 to determine the value of the variable "kind", in this example "Service". The introspection service 20 stores the resource name and resource kind. The introspection service 20 may also obtain the values of any other variables suitable for subsequent presentation to the operator on the display device 18, such as, by way of non-limiting example, metadata.namespace, or the like.

The YAML file 30-6 is reproduced below in Table 6.

TABLE 6

Replicaset resource YAML apiVersion: apps/v1
kind: ReplicaSet
metadata:
   annotations:
      apps.open-cluster-management.io/hosting-deployable:
mortgage-ch/mortgage-channel-Deployment-mortgage-app-deploy
      apps.open-cluster-management.io/hosting-subscription:
default/mortgage-app-subscription
      apps.open-cluster-management.io/sync-source: subgbk8s-
      default/mortgage-app-subscription
      deployment.kubernetes.io/desired-replicas: '1'
      deployment.kubernetes.io/max-replicas: '2'
      deployment.kubernetes.io/revision: '1'
   creationTimestamp: '2020-10-13T16:15:18Z'
   generation: 1

TABLE 6-continued

Replicaset resource YAML labels:
      app: mortgage-app-mortgage
      pod-template-hash: 55c65b9c8f
   name: mortgage-app-deploy-55c65b9c8f
   namespace: default
   ownerReferences:
    - apiVersion: apps/v1
      blockOwnerDeletion: true
      controller: true
      kind: Deployment
      name: mortgage-app-deploy
      uid: e922dcf9-a053-42be-85c3-b0a2859f0765
   resourceVersion: '182710344'
   selfLink: /apis/apps/v1/namespaces/default/replicasets/mortgage-
app-deploy-55c65b9c8f
   uid: be2845d8-6378-4933-99cb-6b2fa0c83077
spec:
   replicas: 1
   selector:
      matchLabels:
         app: mortgage-app-mortgage
         pod-template-hash: 55c65b9c8f
   template:
      metadata:
         creationTimestamp: null
         labels:
            app: mortgage-app-mortgage
            pod-template-hash: 55c65b9c8f
      spec:
         containers:
         - image: 'fxiang/mortgage:0.4.0'
           imagePullPolicy: Always
           name: mortgage-app-mortgage
           ports:
            - containerPort: 9080
              protocol: TCP
           resources:
            limits:
              cpu: 200m
              memory: 256Mi
           terminationMessagePath: /dev/termination-log
           terminationMessagePolicy: File
         dnsPolicy: ClusterFirst
         restartPolicy: Always
         schedulerName: default-scheduler
         securityContext: { }
         terminationGracePeriodSeconds: 30

The introspection service 20 parses the YAML file 30-6 to determine the value of the variable "metadata.name", in this example, "mortgage-app-deploy-55c65b9c8f", which is the name of the resource that corresponds to the YAML file 30-6. The introspection service 20 also parses the YAML file 30-6 to determine the value of the variable "kind", in this example "ReplicaSet". The introspection service 20 stores the resource name and resource kind. The introspection service 20 may also obtain the values of any other variables suitable for subsequent presentation to the operator on the display device 18, such as, by way of non-limiting example, metadata.namespace, or the like.

The YAML file 30-7 is reproduced below in Table 7.

TABLE 7

Pod resource YAML apiVersion: v1
kind: Pod
metadata:
   annotations:
      k85.v1.cni.cncf.io/networks-status: |-
        [{
           "name": "openshift-sdn",
           "interface": "eth0", TABLE 7-continued Pod resource YAML

```
        "ips": [
            "10.129.3.25"
        ],
        "dns": { }
        "default-route": [
            "10.129.2.1"
        ]
    }]
  creationTimestamp: '2020-10-13T16:15:18Z'
  generateName: mortgage-app-deploy-55c65b9c8f-
  labels:
    app: mortgage-app-mortgage
    pod-template-hash: 55c65b9c8f
  name: mortgage-app-deploy-55c65b9c8f-tm688
  namespace: default
  ownerReferences:
    - apiVersion: apps/v1
      blockOwnerDeletion: true
      controller: true
      kind: ReplicaSet
      name: mortgage-app-deploy-55c65b9c8f
      uid: be2845d8-6378-4933-99cb-6b2fa0c83077
  resourceVersion: '182710342'
  selfLink: /api/v1/namespaces/default/pods/mortgage-app-deploy-
55c65b9c8f-tm688
  uid: 83d508e6-113a-49e3-953b-4afceedd2523
spec:
  containers:
    - image: 'fxiang/mortgage:0.4.0'
      imagePullPolicy: Always
      name: mortgage-app-mortgage
      ports:
        - containerPort: 9080
          protocol: TCP
      resources:
        limits:
          cpu: 200m
          memory: 256Mi
        requests:
          cpu: 200m
          memory: 256Mi
      terminationMessagePath: /dev/termination-log
      terminationMessagePolicy: File
      volume Mounts:
        - mountPath: /var/run/secrets/kubernetes.io/serviceaccount
          name: default-token-94rv9
          readOnly: true
  dnsPolicy: ClusterFirst
  enableServiceLinks: true
  imagePullSecrets:
    - name: default-dockercfg-c65mr
  nodeName: ip-10-0-139-164.ec2.internal
  priority: 0
  restartPolicy: Always
  schedulerName: default-scheduler
  securityContext: { }
  serviceAccount: default
  serviceAccountName: default
  terminationGracePeriodSeconds: 30
  tolerations:
    - effect: NoExecute
      key: node.kubernetes.io/not-ready
      operator: Exists
      tolerationSeconds: 300
    - effect: NoExecute
      key: node.kubernetes.io/unreachable
      operator: Exists
      tolerationSeconds: 300
    - effect: NoSchedule
      key: node.kubernetes.io/memory-pressure
      operator: Exists
  volumes:
    - name: default-token-94ry9
      secret:
        defaultMode: 420
        secretName: default-token-94rv9
```

The introspection service 20 parses the YAML file 30-7 to determine the value of the variable "metadata.name", in this example, "mortgage-app-deploy-55c65b9c8f-tm688", which is the name of the resource that corresponds to the YAML file 30-7. The introspection service 20 also parses the YAML file 30-7 to determine the value of the variable "kind", in this example "Pod". The introspection service 20 stores the resource name and resource kind. The introspection service 20 may also obtain the values of any other variables suitable for subsequent presentation to the operator on the display device 18, such as, by way of non-limiting example, metadata.namespace, or the like.

The introspection service 20 parses the YAML file 30-8 and determines that the application 28-1 is to be deployed on the clusters 22-1 and 22-P. At block 50, the introspection service 20 requests, from the cluster controllers 24-1, 24-P of the clusters 22-1, 22-P, respectively, deployment information for one or more of the resources that identifies the deployment status of the resources. The resources for which the introspection service 20 requests deployment information may be all resources, or may be predetermined kinds of resources, or may be all resources other than certain kinds of resources. The deployment information may be requested in a manner suitable and appropriate for the particular container orchestration system. In a Kubernetes® container orchestration system, the deployment information may be requested by sending the cluster controllers 24-1, 24-P kubectl get commands that include the resource kind and the resource name of the resource for which deployment information is desired. For example, for the deployment resource with the name "mortgage-app-deploy", the introspection service 20 may send each cluster controller 24-1, 24-P the following kubectl get command: "kubectl get deployment mortgage-app-deploy-o yaml". The cluster controllers 24-1, 24-P respectively access the deployment information for the resource 34 and respond with the deployment information to the introspection service 20. Table 8 is an example of the deployment information that may be returned by one of the cluster controllers 24-1, 24-P in response.

TABLE 8

Deployment cluster1 data

```
apiVersion: apps/v1
kind: Deployment
metadata:
  annotations:
    apps.open-cluster-management.io/hosting-deployable:
mortgage-ch/mortgage-channel-Deployment-mortgage-app-deploy
    apps.open-cluster-management.io/hosting-subscription:
default/mortgage-app-subscription
    apps.open-cluster-management.io/sync-source: subgbk8s-
default/mortgage-app-subscription
    deployment.kubernetes.io/revision: '1'
  creationTimestamp: '2020-10-13T16:15:18Z'
  generation: 10017
  labels:
    app: mortgage-app-mortgage
  name: mortgage-app-deploy
  namespace: default
  resourceVersion: '189056239'
  selfLink:
/apis/apps/v1/namespaces/default/deployments/mortgage-app-
deploy
  uid: e922dcf9-a053-42be-85c3-b0a2859f0765
spec:
  progressDeadlineSeconds: 600
  replicas: 1
  revisionHistoryLimit: 10
```

TABLE 8-continued

Deployment cluster1 data

```
  selector:
    matchLabels:
      app: mortgage-app-mortgage
  strategy:
    rollingUpdate:
      maxSurge: 25%
      maxUnavailable: 25%
    type: RollingUpdate
  template:
    metadata:
      creationTimestamp: null
      labels:
        app: mortgage-app-mortgage
    spec:
      containers:
        - image: 'fxiang/mortgage:0.4.0'
          imagePullPolicy: Always
          name: mortgage-app-mortgage
          ports:
            - containerPort: 9080
              protocol: TCP
          resources:
            limits:
              cpu: 200m
              memory: 256Mi
          terminationMessagePath: /dev/termination-log
          terminationMessagePolicy: File
      dnsPolicy: ClusterFirst
      restartPolicy: Always
      schedulerName: default-scheduler
      securityContext: { }
      terminationGracePeriodSeconds: 30
status:
  availableReplicas: 1
  conditions:
    - lastTransitionTime: '2020-10-13T16:15:22Z'
      lastUpdateTime: '2020-10-13T16:15:22Z'
      message: Deployment has minimum availability.
      reason: MinimumReplicasAvailable
      status: 'True'
      type: Available
    - lastTransitionTime: '2020-10-13T16:15:18Z'
      lastUpdateTime: '2020-10-13T16:15:22Z'
      message: ReplicaSet "mortgage-app-deploy-55c65b9c8f" has
successfully progressed.
      reason: NewReplicaSetAvailable
      status: 'True'
      type: Progressing
  observedGeneration: 10017
  readyReplicas: 1
  replicas: 1
  updatedReplicas: 1
```

For the service resource with the name "mortgage-app-svc", the introspection service 20 may send each cluster controller 24-1, 24-P the following kubectl get command: "kubectl get service mortgage-app-svc -o yaml". The cluster controllers 24-1, 24-P respectively access the deployment information for the resource 36 and respond with the deployment information to the introspection service 20.

Table 9 is an example of the deployment information that may be returned by one of the cluster controllers 24-1, 24-P in response.

TABLE 9

Service cluster1 data

```
apiVersion: v1
kind: Service
metadata:
  annotations:
    apps.open-cluster-management.io/hosting-deployable:
mortgage-ch/mortgage-channel-Service-mortgage-app-svc
    apps.open-cluster-management.io/hosting-subscription:
default/mortgage-app-subscription
    apps.open-cluster-management.io/sync-source: subgbk8s-
default/mortgage-app-subscription
  creationTimestamp: '2020-10-13T16:15:17Z'
  labels:
    app: mortgage-app-mortgage
  name: mortgage-app-svc
  namespace: default
  resourceVersion: '189066055'
  selfLink: /api/v1/namespaces/default/services/mortgage-app-svc
  uid: 1347e26b-c1b2-4d24-aa4a-771e00ed40b4
spec:
  clusterIP: 172.30.193.153
  externalTrafficPolicy: Cluster
  ports:
    - nodePort: 31490
      port: 9080
      protocol: TCP
      targetPort: 9080
  selector:
    app: mortgage-app-mortgage
  sessionAffinity: None
  type: NodePort
status:
  loadBalancer: { }
```

For the replicaset resource with the name "mortgage-app-deploy-55c65b9c8f", the introspection service 20 may send each cluster controller 24-1, 24-P the following kubectl get command: "kubectl get replicaset mortgage-app-deploy-55c65b9c8f -o yaml". The cluster controllers 24-1, 24-P respectively access the deployment information for the resource 38 and respond with the deployment information to the introspection service 20. Table 10 is an example of the deployment information that may be returned by one of the cluster controllers 24-1, 24-P in response.

TABLE 10

Replicaset cluster1 data

```
apiVersion: apps/v1
kind: ReplicaSet
metadata:
  annotations:
    apps.open-cluster-management.io/hosting-deployable:
mortgage-ch/mortgage-channel-Deployment-mortgage-app-deploy
    apps.open-cluster-management.io/hosting-subscription:
default/mortgage-app-subscription
    apps.open-cluster-management.io/sync-source: subgbk8s-
default/mortgage-app-subscription
    deployment.kubernetes.io/desired-replicas: '1'
    deployment.kubernetes.io/max-replicas: '2'
    deployment.kubernetes.io/revision: '1'
  creationTimestamp: '2020-10-13T16:15:18Z'
  generation: 1
  labels:
    app: mortgage-app-mortgage
    pod-template-hash: 55c65b9c8f
  name: mortgage-app-deploy-55c65b9c8f
  namespace: default
  ownerReferences:
    - apiVersion: apps/v1
      blockOwnerDeletion: true
      controller: true
      kind: Deployment
      name: mortgage-app-deploy
      uid: e922dcf9-a053-42be-85c3-b0a2859f0765
  resourceVersion: '182710344'
  selfLink: /apis/apps/v1/namespaces/default/replicasets/mortgage-
app-deploy-55c65b9c8f
  uid: be2845d8-6378-4933-99cb-6b2fa0c83077
```

TABLE 10-continued

Replicaset cluster1 data

```
spec:
  replicas: 1
  selector:
    matchLabels:
      app: mortgage-app-mortgage
      pod-template-hash: 55c65b9c8f
  template:
    metadata:
      creationTimestamp: null
      labels:
        app: mortgage-app-mortgage
        pod-template-hash: 55c65b9c8f
    spec:
      containers:
        - image: 'fxiang/mortgage:0.4.0'
          imagePullPolicy: Always
          name: mortgage-app-mortgage
          ports:
            - containerPort: 9080
              protocol: TCP
          resources:
            limits:
              cpu: 200m
              memory: 256Mi
          terminationMessagePath: /dev/termination-log
          terminationMessagePolicy: File
      dnsPolicy: ClusterFirst
      restartPolicy: Always
      schedulerName: default-scheduler
      securityContext: { }
      terminationGracePeriodSeconds: 30
status:
  availableReplicas: 1
  fullyLabeledReplicas: 1
  observedGeneration: 1
  readyReplicas: 1
  replicas: 1
```

For the pod resource, the introspection service 20 may send the cluster controllers 24-1, 24-P a "kubectl get pod" command to determine the names of the pods that are deployed on the respective clusters 22-1, 22-P. Table 11 is an example of the deployment information that may be returned by one of the cluster controllers 24-1, 24-P in response.

TABLE 11

POD Deployment Information

| NAME | READY | STATUS | RESTARTS | AGE |
|---|---|---|---|---|
| apache-e9120-564c7bfbb7-pqtt7 | 1/1 | Running | 0 | 3 d 5 h |
| frontend-6cb7f8bd65-2fdwx | 1/1 | Running | 0 | 2 d 8 h |
| frontend-6cb7f8bd65-mq7kf | 1/1 | Running | 0 | 2 d 8 h |
| frontend-6cb7f8bd65-st9fn | 1/1 | Running | 0 | 2 d 8 h |
| mortgage-app-deploy-55c65b9c8f-tm688 | 1/1 | Running | 0 | 3 d 5 h |
| mortgagedc-deploy-1-deploy | 0/1 | Completed | 0 | 2 d 7 h |
| mortgagedc-deploy-1-t874x | 1/1 | Running | 0 | 2 d 7 h |
| redis-master-7db7f6579f-qpnm6 | 1/1 | Running | 0 | 2 d 8 h |
| redis-slave-5bdcfd74c7-fcvmp | 1/1 | Running | 0 | 2 d 8 h |
| redis-slave-5bdcfd74c7-tvxr4 | 1/1 | Running | 0 | 2 d 8 h |

The introspection service 20 may then analyze the names of the pods searching for a pod name that has, as a component of the pod name, the same name as the replicaset "mortgage-app-deploy-55c65b9c8f". In this example, the introspection service 20 identifies a pod with the name "mortgage-app-deploy-55c65b9c8f-tm688" The introspection service 20 may then send the cluster controllers 24-1, 24-P a "kubectl get pod mortgage-app-deploy-55c65b9c8f-tm688-o yaml" command to obtain the deployment information for the pod resource 40. Table 12 is an example of the deployment information that may be returned by one of the cluster controllers 24-1, 24-P in response.

TABLE 12

Pod cluster1 data

```
apiVersion: v1
kind: Pod
metadata:
  annotations:
    k8s.v1.cni.cncf.io/networks-status: |-
      [{
          "name": "openshift-sdn",
          "interface": "eth0",
          "ips": [
              "10.129.3.25"
          ],
          "dns": { }
          "default-route": [
              "10.129.2.1"
          ]
      }]
  creationTimestamp: '2020-10-13T16:15:18Z'
  generateName: mortgage-app-deploy-55c65b9c8f-
  labels:
    app: mortgage-app-mortgage
    pod-template-hash: 55c65b9c8f
  name: mortgage-app-deploy-55c65b9c8f-tm688
  namespace: default
  ownerReferences:
    - apiVersion: apps/v1
      blockOwnerDeletion: true
      controller: true
      kind: ReplicaSet
      name: mortgage-app-deploy-55c65b9c8f
      uid: be2845d8-6378-4933-99cb-6b2fa0c83077
  resourceVersion: '182710342'
  selfLink: /api/v1/namespaces/default/pods/mortgage-app-deploy-55c65b9c8f-tm688
  uid: 83d508e6-113a-49e3-953b-4afceedd2523
spec:
  containers:
    - image: 'fxiang/mortgage:0.4.0'
      imagePullPolicy: Always
      name: mortgage-app-mortgage
      ports:
        - containerPort: 9080
          protocol: TCP
      resources:
        limits:
          cpu: 200m
          memory: 256Mi
        requests:
          cpu: 200m
          memory: 256Mi
      terminationMessagePath: /dev/termination-log
      terminationMessagePolicy: File
      volumeMounts:
        - mountPath: /var/run/secrets/kubernetes.io/serviceaccount
          name: default-token-94rv9
          readOnly: true
  dnsPolicy: ClusterFirst
  enableServiceLinks: true
  imagePullSecrets:
    - name: default-dockercfg-c65mr
  nodeName: ip-10-0-139-164.ec2.internal
  priority: 0
  restartPolicy: Always
  schedulerName: default-scheduler
  securityContext: { }
  serviceAccount: default
  serviceAccountName: default
```

TABLE 12-continued

Pod cluster1 data

```
terminationGracePeriodSeconds: 30
tolerations:
   - effect: NoExecute
      key: node.kubernetes.io/not-ready
      operator: Exists
      tolerationSeconds: 300
   - effect: NoExecute
      key: node.kubernetes.io/unreachable
      operator: Exists
      tolerationSeconds: 300
   - effect: NoSchedule
      key: node.kubernetes.io/memory-pressure
      operator: Exists
volumes:
   - name: default-token-94rv9
      secret:
         defaultMode: 420
         secretName: default-token-94rv9
status:
   conditions:
      - lastProbeTime: null
         lastTransitionTime: '2020-10-13T16:15:18Z'
         status: 'True'
         type: Initialized
      - lastProbeTime: null
         lastTransitionTime: '2020-10-13T16:15:22Z'
         status: 'True'
         type: Ready
      - lastProbeTime: null
         lastTransitionTime: '2020-10-13T16:15:22Z'
         status: 'True'
         type: ContainersReady
      - lastProbeTime: null
         lastTransitionTime: '2020-10-13T16:15:18Z'
         status: 'True'
         type: PodScheduled
   containerStatuses:
      - containerID: 'cri-
o://74ed9258135090bc0a8489653230add77fea9fbd0516183264d0
4e20bb156622'
         image: 'docker.io/fxiang/mortgage:0.4.0'
         imageID: >-
         docker.io/fxiang/mortgage@sha256:8d44359dd4c6d0aedb7e3
59726e9685cf56e77bbaeacfe94e06fa357fe9cb2e3
         lastState: { }
         name: mortgage-app-mortgage
         ready: true
         restartCount: 0
         started: true
         state:
            running:
               startedAt: '2020-10-13T16:15:22Z'
   hostIP: 10.0.139.164
   phase: Running
   podIP: 10.129.3.25
   podIPs:
      - ip: 10.129.3.25
   qosClass: Guaranteed
   startTime: '2020-10-13T16:15:18Z'
```

At block 52, the introspection service 20 may correlate and consolidate the application information 29 and the deployment information received from the cluster controllers 24-1 and 24-P to generate application resource deployment information 42. The application resource deployment information 42 may maintain, for each resource, information obtained from the corresponding YAML file 30-4-30-8, and deployment information obtained from the cluster controllers 24-1 and 24-P. The introspection service 20 may use the application resource deployment information 42 to, for example, generate the user interface imagery 44 that identifies some of the resources and the deployment status of the resources.

Figure 4A:
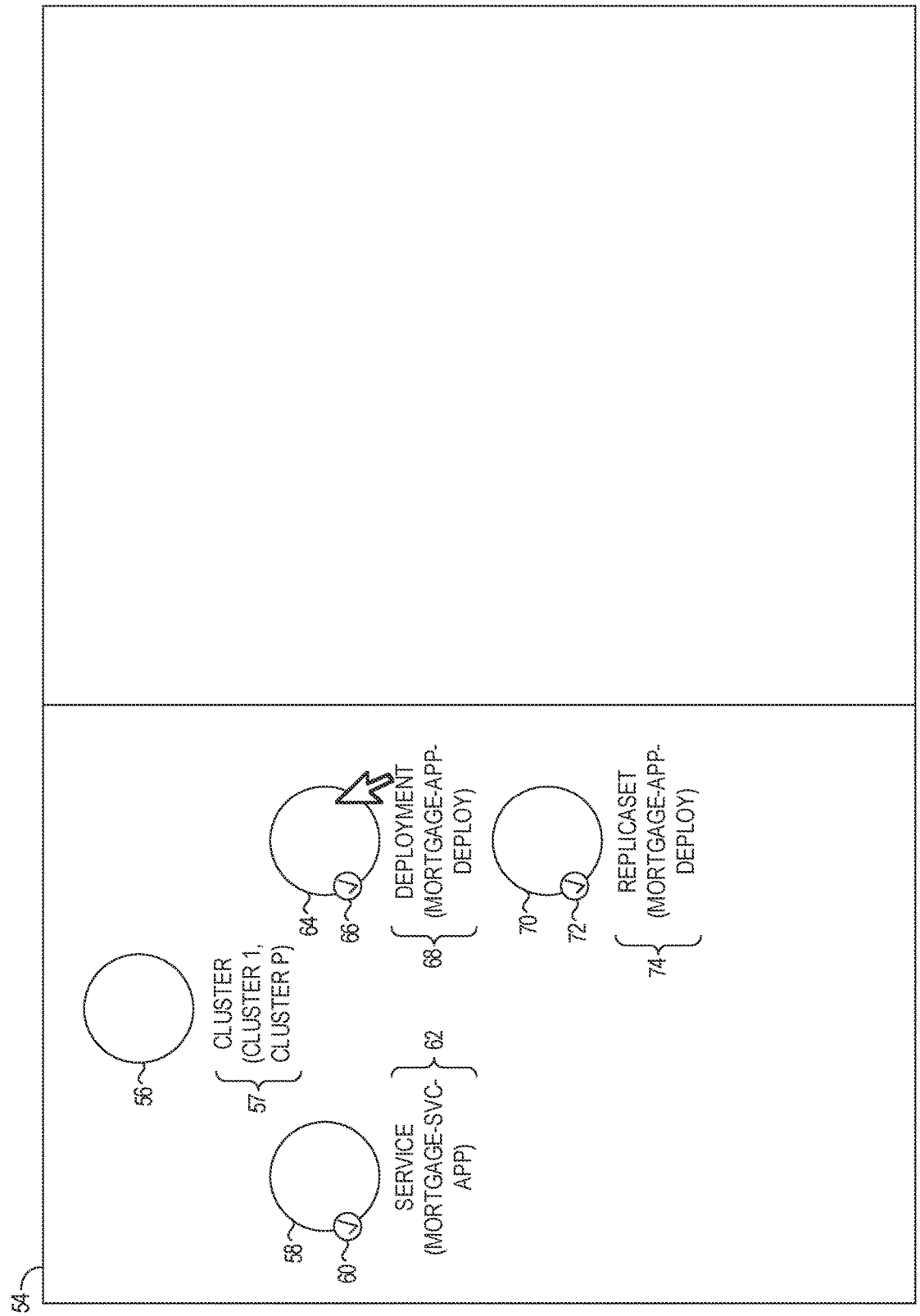
FIGS. 4A-4D illustrate various user interface imagery that may be presented on a display device according to one example.

FIGS. 4A-4D illustrate various user interface imagery that may be presented on the display device 18 in accordance with one implementation. Referring first to FIG. 4A, in response to an operator input, the introspection service 20 may generate an initial user interface imagery 54 that includes a cluster resource icon 56 that represents the clusters 22-1 and 22-P, and text 57 that identifies the clusters 22 on which the application 28-1 has been deployed. A service resource icon 58 corresponds to the service resource 36 and includes a successful deployment indicator 60 to indicate that the service resource 36 has been successfully deployed on the clusters 22-1 and 22-P. A different indicator may be used to indicate that the service resource 36 was not deployed successfully on either the cluster 22-1 or the 22-P, and another indicator may be used to indicate that the service resource 36 was deployed successfully on one of the clusters 22-1, 22-P but not on the other cluster 22-1, 22-P. Text 62 identifies the resource kind (service) and the name (mortgage-svc-app) of the service resource 36.

A deployment resource icon 64 corresponds to the deployment resource 34 and includes a successful deployment indicator 66 to indicate that the deployment resource 34 has been successfully deployed on the clusters 22-1 and 22-P. Text 68 identifies the resource kind (deployment) and the name (mortgage-app-deploy) of the deployment resource 34. A replicaset resource icon 70 corresponds to the replicaset resource 38 and includes a successful deployment indicator 72 to indicate that the replicaset resource 38 has been successfully deployed on the clusters 22-1 and 22-P. Text 74 identifies the resource kind (replicaset) and the name (mortgage-app-deploy) of the replicaset resource 38. In this example, the full name of the replicaset resource 38 "mortgage-app-deploy-55c65b9c8f" has been truncated to remove the "55c65b9c8f" portion of the name.

Figure 4B:
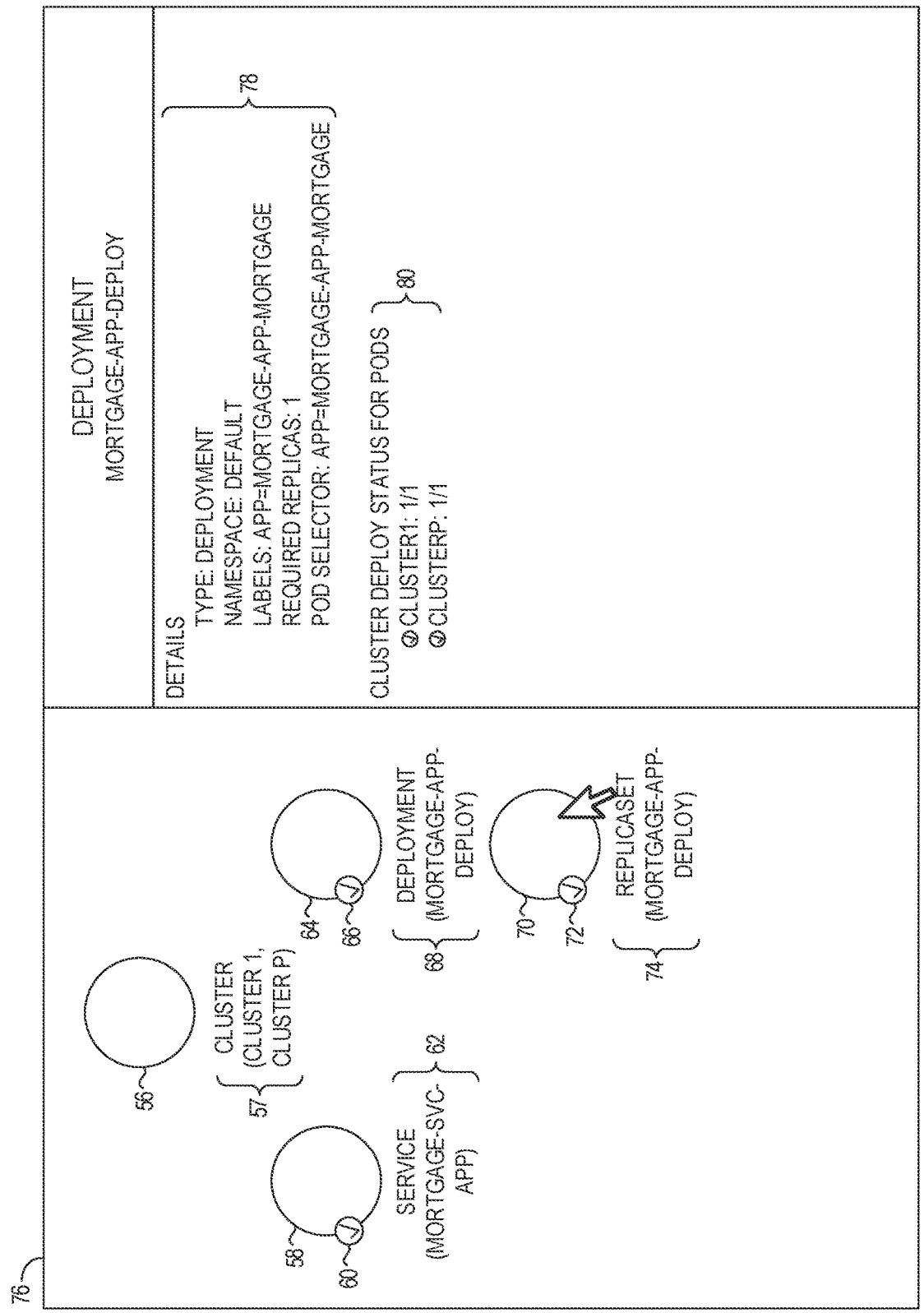

Assume for purposes of illustration that the operator selects the deployment resource icon 64, such as by using a mouse or other input mechanism. Referring now to FIG. 4B, in response to the selection of the deployment resource icon 64, the introspection service 20 generates and presents user interface imagery 76 on the display device 18. The user interface imagery 76 includes a details section 78, which is derived from the YAML file 30-4, and a deployment status 80 that identifies the deployment status of the deployment resource 34 on the clusters 22-1 and 22-P. The deployment status 80 was derived from the deployment information received from the cluster controllers 24-1 and 24-P. In this example, the value "1" prior to the "/" identifies a "ready deployment status", and the value "1" after the "/" identifies a desired deployment status. While for purposes of illustration only certain information is provided in the details section 78 and the deployment status 80, it will be appreciated that the introspection service 20 may provide any suitable information from the YAML file 30-4 in the details section 78 and may provide any suitable information from the deployment information received from the cluster controllers 24-1 and 24-P in the deployment status 80.

Figure 4C:
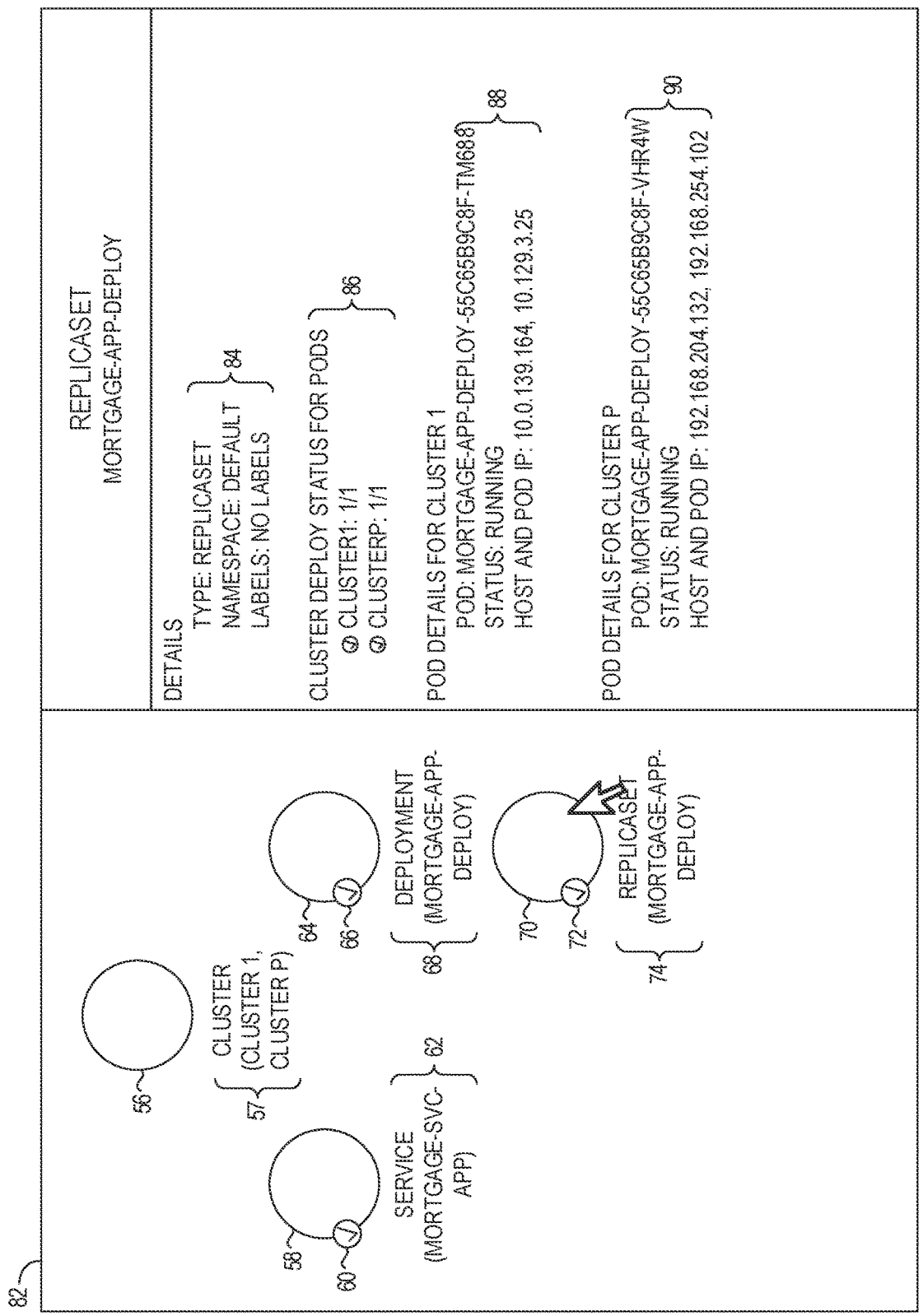

Assume for purposes of illustration that the operator selects the replicaset resource icon 70. Referring now to FIG. 4C, in response to the selection of the replicaset resource icon 70, the introspection service 20 generates and presents user interface imagery 82 on the display device 18. The user interface imagery 82 includes a details section 84 that is derived from the YAML file 30-6, a deployment status 86 that identifies the deployment status of the pod resources 40, a pod details 88 that provides the detail of the pod resource 40 on the cluster 22-1 and a pod details 90 that provides the detail of the pod resource 40 on the cluster 22-P. The deployment status 86 and pod details 88, 90 were derived from the deployment information received from the cluster controllers 24-1 and 24-P.

Figure 4D:
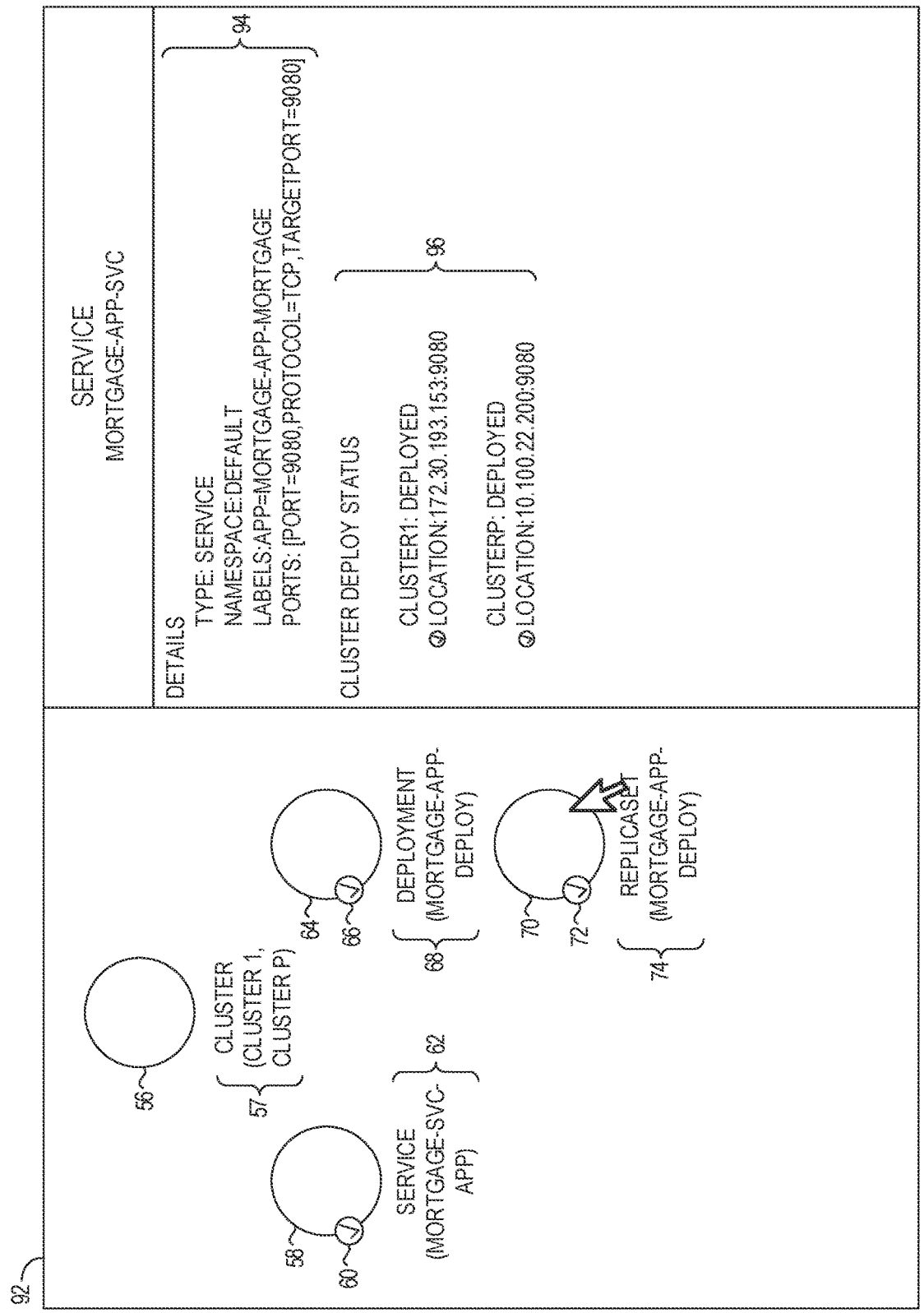

Assume for purposes of illustration that the operator selects the service resource icon 58. Referring now to FIG. 4D, in response to the selection of the service resource icon 58, the introspection service 20 generates and presents user interface imagery 92 on the display device 18. The user interface imagery 92 includes a details section 94 that is derived from the YAML file 30-5, and a deployment status 96 that identifies the deployment status of the service resource 36 on each of the clusters 22-1, 22-P. The deployment status 96 was derived from the deployment information received from the cluster controllers 24-1 and 24-P.

Figure 5:
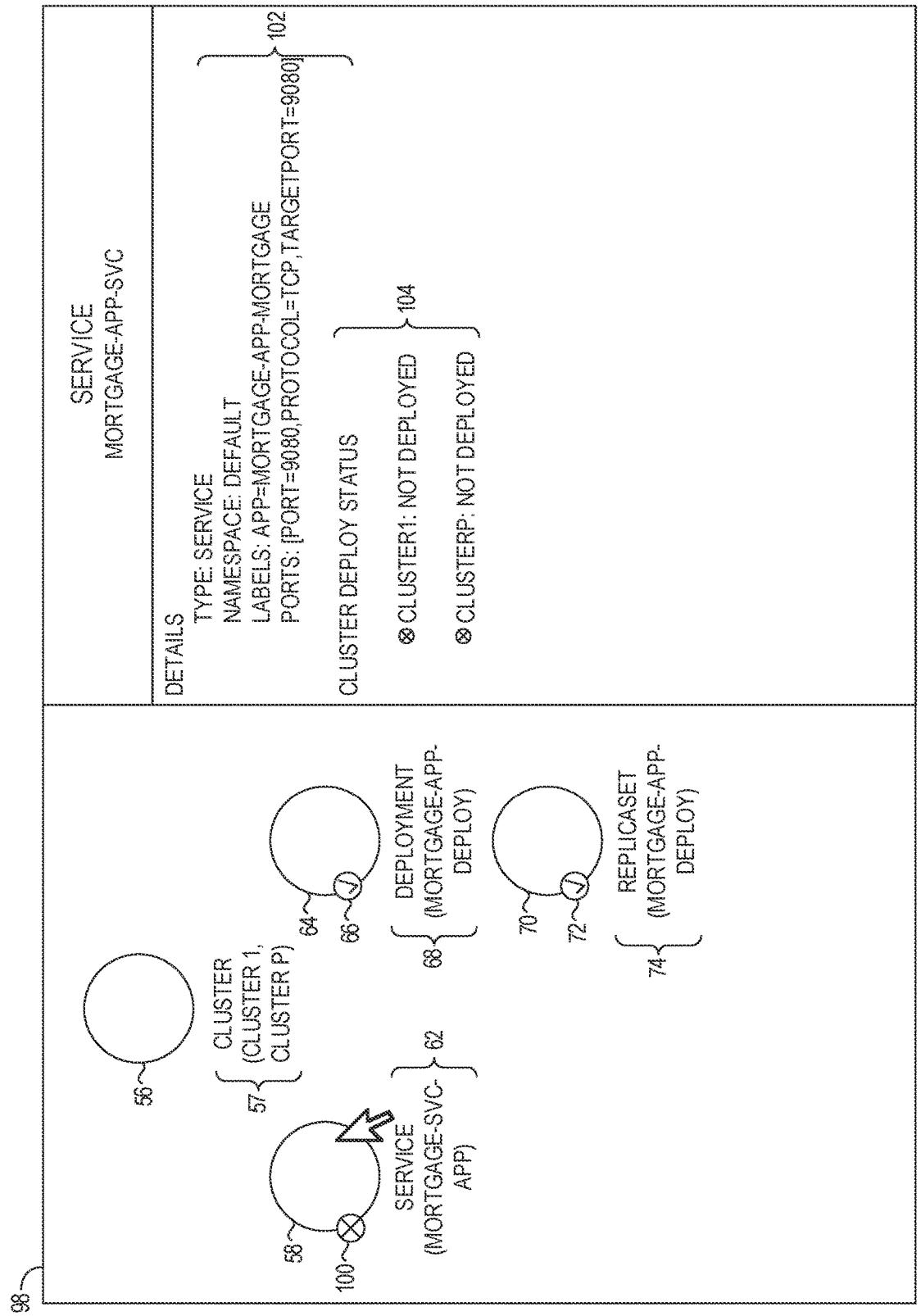
FIG. 5 illustrates user interface imagery that may be presented on a display device according to another example.

FIG. 5 illustrates user interface imagery 98 that may be presented on the display device 18 in accordance with another example. In this example, the deployment of the service resource was unsuccessful. The service resource icon 58 includes an unsuccessful deployment indicator 100 that indicates that the service resource was not successfully deployed. The user interface imagery 98 includes a details section 102 that is derived from the YAML file 30-5, and a deployment status 104 that indicates that the service resource was not deployed on either the cluster 22-1 or the cluster 22-P. The deployment status 104 was derived from the response from the cluster controllers 24-1 and 24-P in response to deployment information for the service resource.

Figure 6:
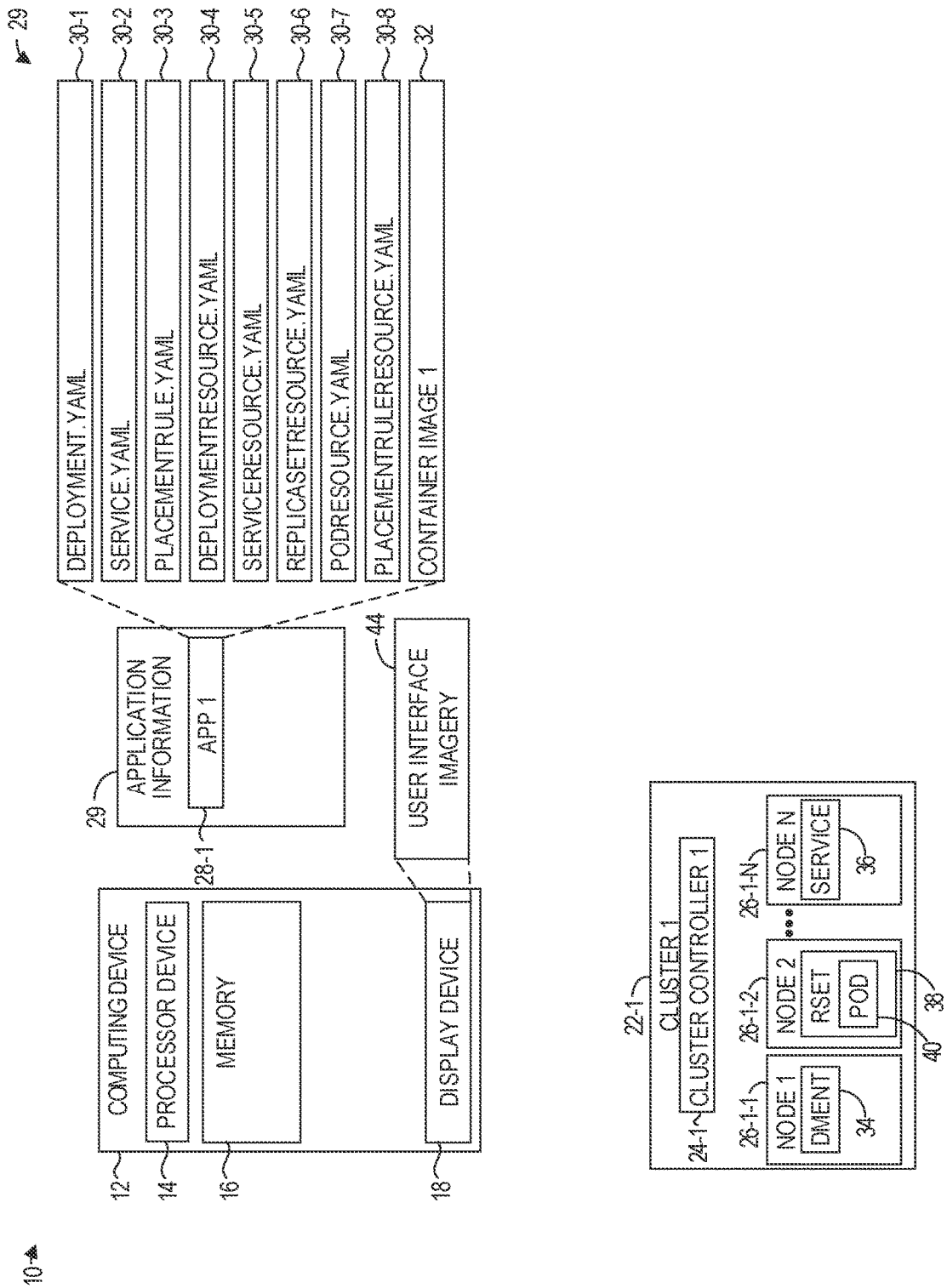
FIG. 6 is a simplified block diagram of the runtime environment illustrated in FIG. 1 according to one example.

FIG. 6 is a simplified block diagram of the environment 10 according to one implementation. The environment 10 includes the computing device 12, the memory 16, and the processor device 14 coupled to the memory 16 to obtain the application information 29 that identifies a plurality of resources that compose the application 28-1. The processor device 14 is further to request, from the cluster controller 24-1 of the cluster 22-1, based on the application information 29, deployment information for one or more of the plurality of resources, wherein the first cluster controller 24-1 is configured to control resources implemented on the plurality of different nodes 26-1-1-26-1-N of the cluster 22-1. The processor device 14 is further to generate, based on the application information 29 and the deployment information, user interface imagery 44 identifying at least some of the resources and a corresponding deployment status of the at least some of the resources. The processor device 14 is further to present, on the display device 18, the user interface imagery 44.

Figure 7:
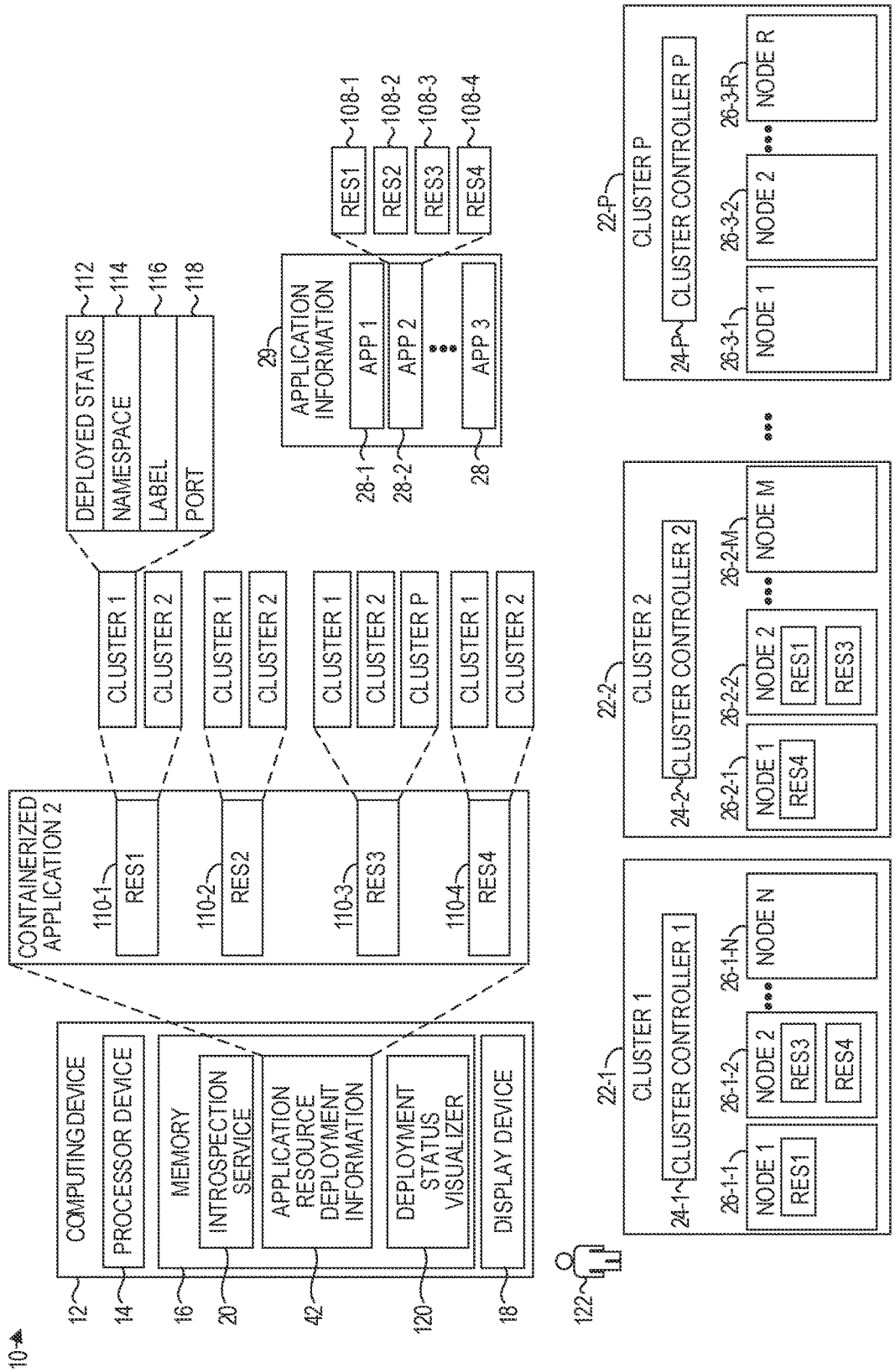
FIG. 7 is a block diagram of the environment illustrated in FIG. 1 according to another example.

FIG. 7 is a block diagram of the runtime environment 10 according to another example. In this example a containerized application 28-2 is composed of four resources 108-1-108-4 (generally, resources 108). The resource 108-1 is intended to be deployed on the clusters 22-1 and 22-2; the resource 108-2 is intended to be deployed on the clusters 22-1 and 22-2; the resource 108-3 is intended to be deployed on the clusters 22-1, 22-2, and 22-P; and the resource 108-4 is intended to be deployed on the clusters 22-1 and 22-2. The information that identifies on which clusters the resources 108 are intended to be deployed can be obtained in any desirable manner, such as that discussed above with regard to FIGS. 1-6, from a configuration file, or the like.

The introspection service 20 obtains the application resource deployment information 42 for the application 28-2 in any suitable manner. In some implementations, the introspection service 20 obtains the application resource deployment information 42 (sometimes referred to herein as "deployment information 42" for the sake of brevity) in the manner discussed above with regard to FIGS. 1-6, and requests, from each of the cluster controllers 24-1, 24-2 and 24-P application resource deployment information for the resources 108 that compose the containerized application. In some implementations, the deployment information 42 may maintain a record 110-1-110-4 for each resource 108-1-108-4, respectively, that contains deployment information for each cluster 22-1, 22-2 and 22-P on which each resource 108-1-108-4 is intended to be deployed. In this example, the record 110-1 includes deployment information regarding deployment of the resource 108-1 on the clusters 22-1 and 22-2; the record 110-2 includes deployment information regarding deployment of the resource 108-2 on the clusters 22-1 and 22-2; the record 110-3 includes deployment information regarding deployment of the resource 108-3 on the clusters 22-1, 22-2 and 22-P; and the record 110-4 includes deployment information regarding deployment of the resource 108-4 on the clusters 22-1 and 22-2.

The particular deployment information 42 that is obtained may differ depending on the particular type of resource 108 and the particular type of container orchestration system, but such information may include, by way of non-limiting example, a deployed status 112, a namespace 114, a label 116, and a port 118. It is noted that these are merely examples, and any information maintained in a corresponding YAML file, such as the information disclosed above in tables 1-10, or obtainable from a cluster controller 22, may be stored in the records 110.

The computing device 12 includes a deployment status visualizer 120 that operates to visualize a deployment status of the resources 108 of the containerized application 28-2 on the clusters 22. In some implementations, an operator 122 interacts with the deployment status visualizer 120 to determine the deployment status of each of the resources 108 on the clusters 22. The deployment status visualizer 120 may present user interface imagery regarding the deployment status of the resources 108 on the display device 18, for example.

It is noted that while the deployment status visualizer 120 is a component of the computing device 12, functionality implemented by the deployment status visualizer 120 may be attributed to the computing device 12 generally. Moreover, in examples where the deployment status visualizer 120 comprises software instructions that program the processor device 14 to carry out functionality discussed herein, functionality implemented by the deployment status visualizer 120 may be attributed herein to the processor device 14.

Figure 8A:
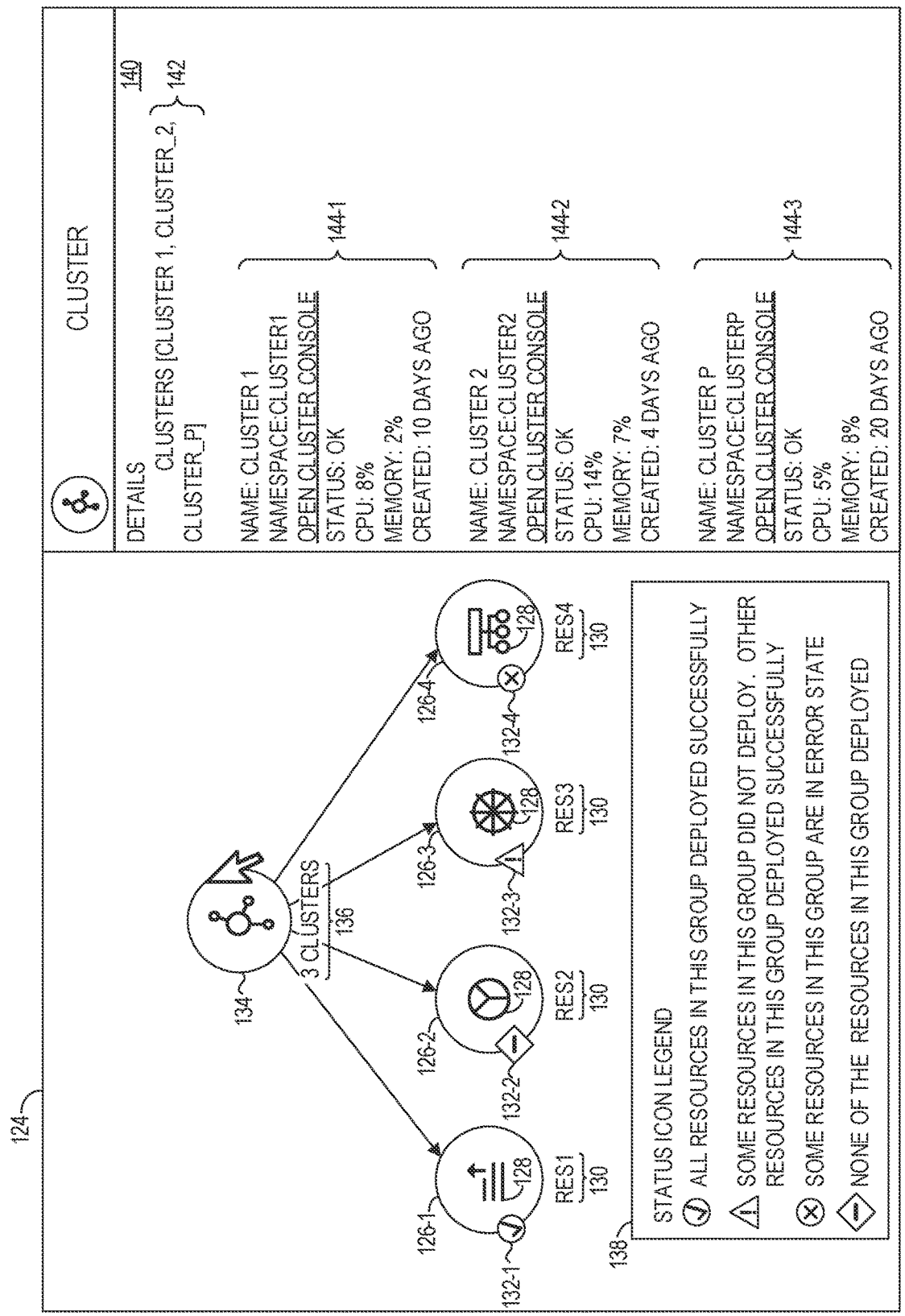
FIGS. 8A-8E illustrate example user interface imagery that a deployment status visualizer may present in response to user inputs from an operator, according to one example.

FIGS. 8A-8E illustrate example user interface imagery that the deployment status visualizer 120 may present in response to user inputs from the operator 122. Referring first to FIG. 8A, the deployment status visualizer 120 may access the application information 29 and the deployment information 42 and generate user interface imagery 124 that identifies a set of the resources 108-1-108-4. In this example, the set of resources 108-1-108-4 is all of the resources 108-1-108-4. However, in some implementations, it may be desirable to not identify certain types of resources, and the set of resources 108 that are presented in the user interface imagery 124 may be a subset of the resources 108. The user interface imagery 124 represents the set of resources 108-1-108-4 via corresponding resource representations 126-1-126-4 (generally, resource representations 126). Note that there is only a single resource representation 126 for each resource 108, irrespective of the number of clusters 22 on which the corresponding resource 108 is to be deployed, or is successfully deployed.

Each resource representation 126 may include a resource type icon 128 that visually indicates a resource type of the resource 108 that corresponds to the resource representation 126. The resource types may differ depending on the particular container orchestration system; however, in a Kubernetes container orchestration system, the resource types may include, by way of non-limiting example, resource types of service, replicaset, deployment, helmrelease, storageclass, statefulset, replicationcontroller, pod, and the like.

The user interface imagery 124 may also present a name 130 of the resource 108 in association with the corresponding resource representation 126. The term "in association" as used herein in the context of user interface imagery refers to placement or other presentation of a piece of information, in this example the name 130, with respect to another piece of information, in this case the corresponding resource representation 126, such that it is intuitive (i.e., clear) to the operator 122 that the two pieces of information relate to one another.

The deployment status visualizer 120 accesses the deployment information 42 to determine, for each resource 108-1-108-4, a corresponding group deployment status indicator 132-1-132-4 that identifies a deployment status of the corresponding resource 108-1-108-4 on the particular group of clusters 22 on which the resource 108-1-108-4 is to be deployed. The deployment status visualizer 120 includes in the user interface imagery 124 the group deployment status indicator 132 in association with the resource representation 126 that corresponds to the resource 108. The user interface imagery 124 may also include a group deployment status indicator legend 138 that explains the meaning of each particular type of group deployment status indicator 132.

In this example the deployment status visualizer 120 accesses the deployment information 42 and determines that the resource 108-1 has been successfully deployed on each cluster 22 of the group of clusters 22-1 and 22-2 on which the resource 108-1 was intended to be deployed. The deployment status visualizer 120 thus includes the group deployment status indicator 132-1 in association with the resource representation 126-1. As indicated by the group deployment status indicator legend 138, the group deployment status indicator 132-1 is an indicator that corresponds to a status wherein a resource 108 has been successfully deployed on each cluster 22 in the group of clusters 22 on which the resource 108 was to be deployed.

In this example the deployment status visualizer 120 determines, based on the deployment information 42, that the resource 108-2 was not successfully deployed on any cluster 22 in the group of clusters 22-1, 22-2 on which the resource 108-2 was to be deployed. The deployment status visualizer 120 thus includes the group deployment status indicator 132-2 in association with the resource representation 126-2. As indicated by the group deployment status indicator legend 138, the group deployment status indicator 132-2 is an indicator that corresponds to a status wherein a resource 108 was not successfully deployed on any cluster 22 in the group of clusters 22 on which the resource 108 was to be deployed.

In this example the deployment status visualizer 120 determines, based on the deployment information 42, that the resource 108-3 was successfully deployed on clusters 22-1 and 22-2 and has not been successfully deployed on the cluster 22-P in the group of clusters 22-1, 22-2 and 22-P on which the resource 108-3 was to be deployed. The deployment status visualizer 120 thus includes the group deployment status indicator 132-3 in association with the resource representation 126-3. As indicated by the group deployment status indicator legend 138, the group deployment status indicator 132-3 is an indicator that corresponds to a status wherein a resource 108 has been successfully deployed on at least one cluster 22 in the group of clusters 22 on which the resource 108 was to be deployed, but has not been successfully deployed on each cluster 22 in the group of clusters 22 on which the resource 108 was to be deployed.

In this example the deployment status visualizer 120 determines, based on the deployment information 42, that the resource 108-4 is deployed on the cluster 22-1, but in an error state, and is deployed on the cluster 22-2, and is in a running state. The deployment status visualizer 120 thus includes the group deployment status indicator 132-4 in association with the resource representation 126-4. As indicated by the group deployment status indicator legend 138, the group deployment status indicator 132-4 is an indicator that corresponds to a status wherein a resource 108 is in an error state on at least one cluster 22 of the group of clusters 22 on which the resource 108 was to be deployed.

In this example the user interface imagery 124 also includes a single cluster representation 134, irrespective of the number of clusters 22 on which the resources 108 are intended to be deployed. The user interface imagery 124 may include a total number 136 of the clusters 22-1, 22-2 and 22-P, in this example, three, in association with the cluster representation 134.

By default, or upon a user input, such as selection by the operator 122 of the cluster representation 134, the deployment status visualizer 120 may generate and include in the user interface imagery 124 an information area 140 that provides information about each of the clusters 22. The information area 140 may include names 142 of each of the clusters, and cluster information 144-1-144-3 for each of the clusters 22. The cluster information 144-1-144-3 may contain any desired information about the clusters 22, such as, by way of non-limiting embodiment, a namespace, a selectable hyperlink that will open a cluster console of the corresponding cluster 22, a status, a current CPU utilization, a memory utilization, and information regarding when the cluster 22 was created.

Figure 8B:
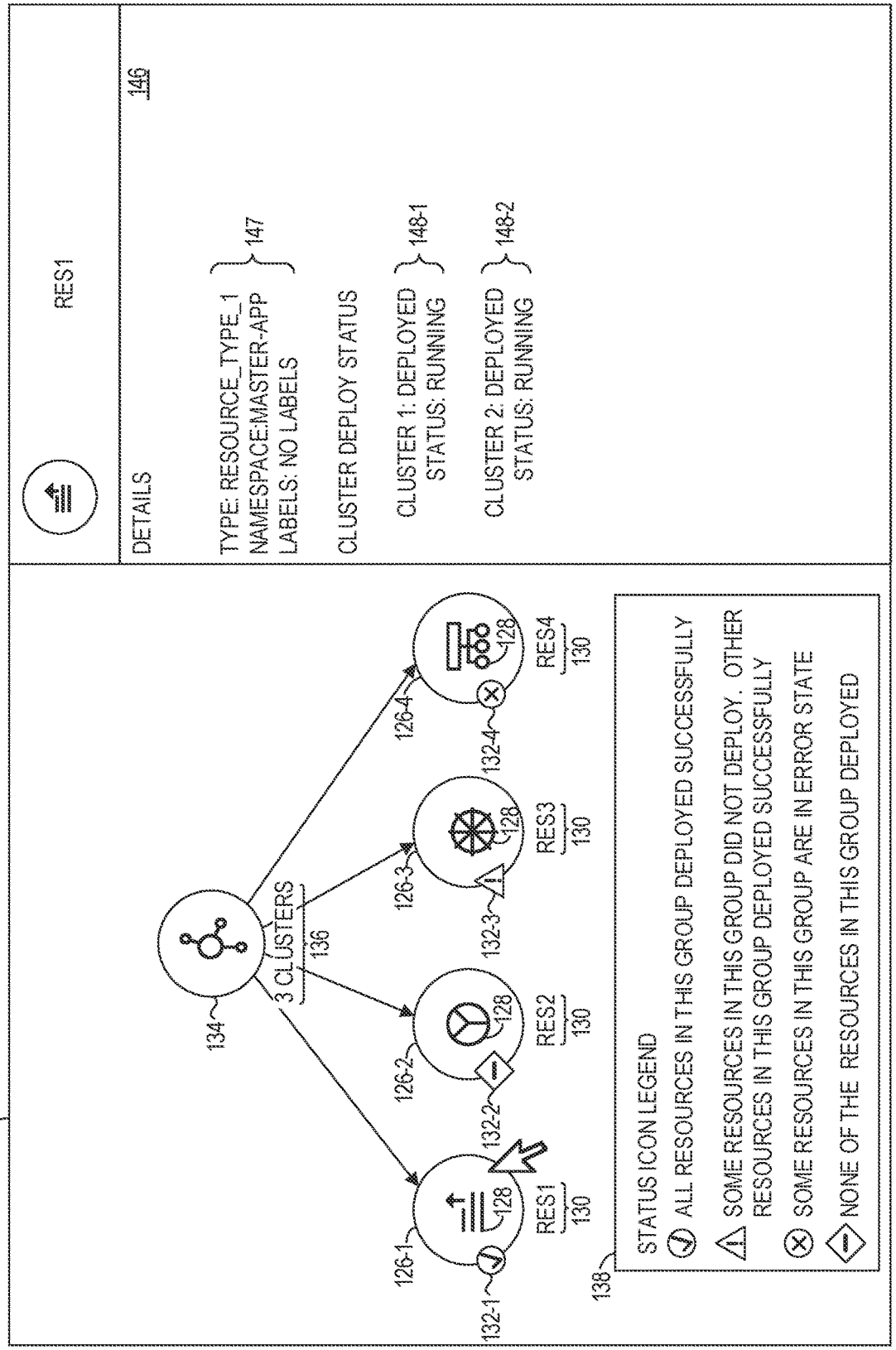

Referring now to FIG. 8B, assume that the operator 122 has selected the resource representation 126-1 to determine detailed information regarding the deployment of the resource 108-1 on the clusters 22 on which the resource 108-1 was to be deployed. In response, the deployment status visualizer 120 generates and includes in the user interface imagery 124 an information area 146 that provides a miscellaneous resource information area 147 that provides certain details about the resource 108-1, such as, by way of non-limiting example, a resource type of the resource 108-1, a namespace of the resource 108-1, and that there are no labels for the resource 108-1.

The deployment status visualizer 120 also generates and includes in the user interface imagery 124 a deployment status information area 148-1 that indicates that the resource 108-1 was successfully deployed on the cluster 22-1, and that the resource 108-1 is in a running state on the cluster 22-1. The deployment status visualizer 120 also generates and includes a deployment status information area 148-2 that indicates that the resource 108-1 was successfully deployed on the cluster 22-2, and that the resource 108-1 is in a running state on the cluster 22-2. It is noted that the information area 146 may include any other desirable information and or details about the resource 108-1 and or the clusters 22-1, 22-2 as appropriate or desired.

Figure 8C:
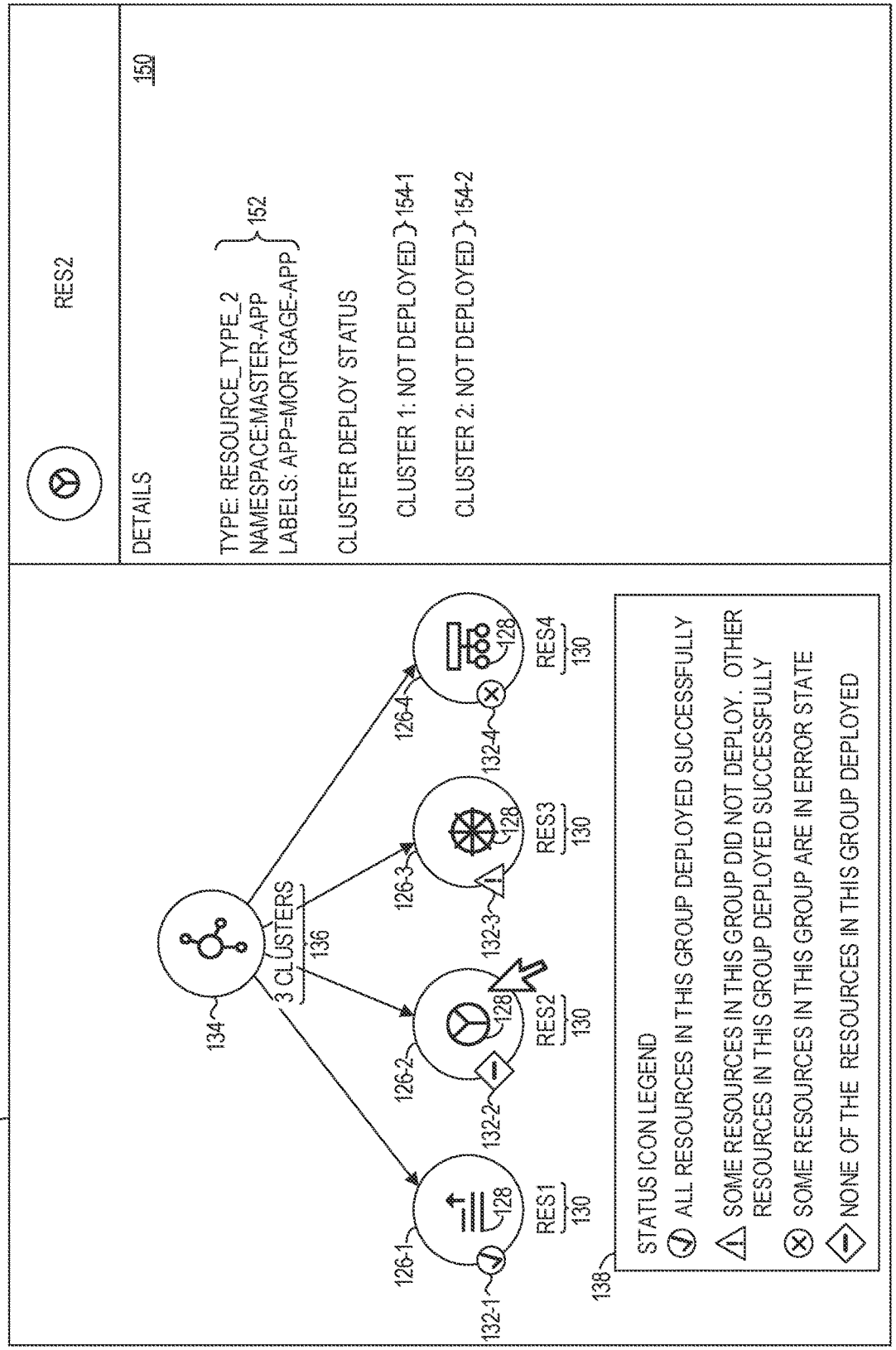

Referring now to FIG. 8C, assume that the operator 122 has selected the resource representation 126-2 to determine detailed information regarding the deployment of the resource 108-2 on the clusters 22 on which the resource 108-2 was to be deployed. In response, the deployment status visualizer 120 generates and includes in the user interface imagery 124 an information area 150 that provides a miscellaneous resource information area 152 that provides certain details about the resource 108-2, such as, by way of non-limiting example, a resource type of the resource 108-2, a namespace of the resource 108-2, and a label associated with the resource 108-2.

The deployment status visualizer 120 also generates and includes in the user interface imagery 124 a deployment status information area 154-1 that indicates that the resource 108-2 was not successfully deployed on the cluster 22-1, and a deployment status information area 154-2 that indicates that the resource 108-2 was not successfully deployed on the cluster 22-2. It is noted that the information area 150 may include any other desirable information and or details about the resource 108-2 and or the clusters 22-1, 22-2 as appropriate or desired.

Figure 8D:
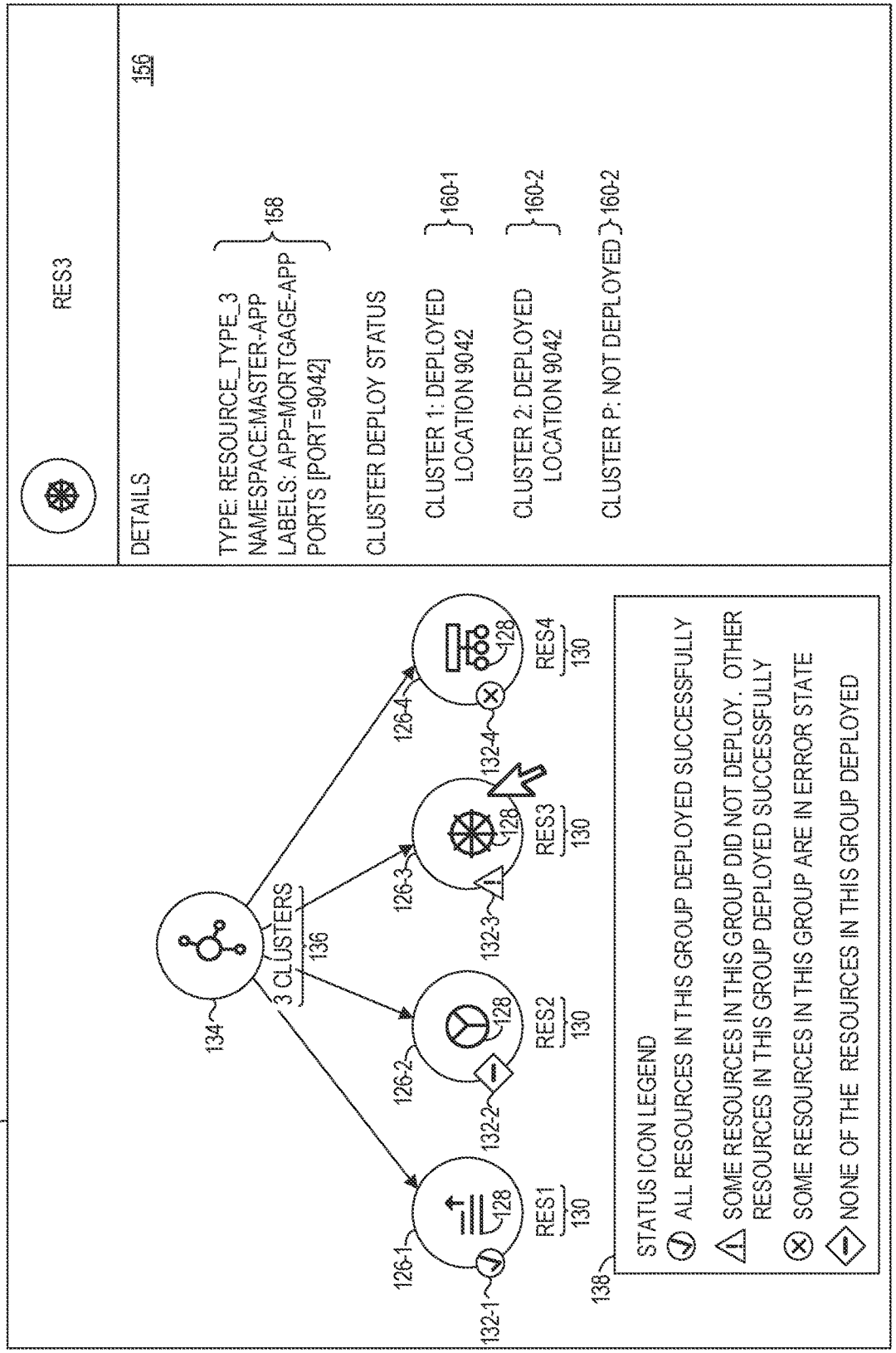

Referring now to FIG. 8D, assume that the operator 122 has selected the resource representation 126-3 to determine detailed information regarding the deployment of the resource 108-3 on the clusters 22 on which the resource 108-3 was to be deployed. In response, the deployment status visualizer 120 generates and includes in the user interface imagery 124 an information area 156 that provides a miscellaneous resource information area 158 that provides certain details about the resource 108-3, such as, by way of non-limiting example, a resource type of the resource 108-3, a namespace of the resource 108-3, a label associated with the resource 108-3, and port number associated with the resource 108-3.

The deployment status visualizer 120 also generates and includes in the user interface imagery 124 a deployment status information area 160-1 that indicates that the resource 108-3 was successfully deployed on the cluster 22-1, and is located at port number 9042 on the cluster 22-1. The deployment status visualizer 120 also generates and includes in the user interface imagery 124 a deployment status information area 160-2 that indicates that the resource 108-3 was successfully deployed on the cluster 22-2, and is located at port number 9042 on the cluster 22-2. The deployment status visualizer 120 also generates and includes in the user interface imagery 124 a deployment status information area 160-3 that indicates that the resource 108-3 was not successfully deployed on the cluster 22-P. Thus, the operator 122 is able to quickly ascertain that there was a deployment problem with the cluster 22-P and can efficiently focus her efforts on resolving the deployment problem. It is noted that the information area 156 may include any other desirable information and or details about the resource 108-3 and or the clusters 22-1, 22-2 and 22-P as appropriate or desired.

Figure 8E:
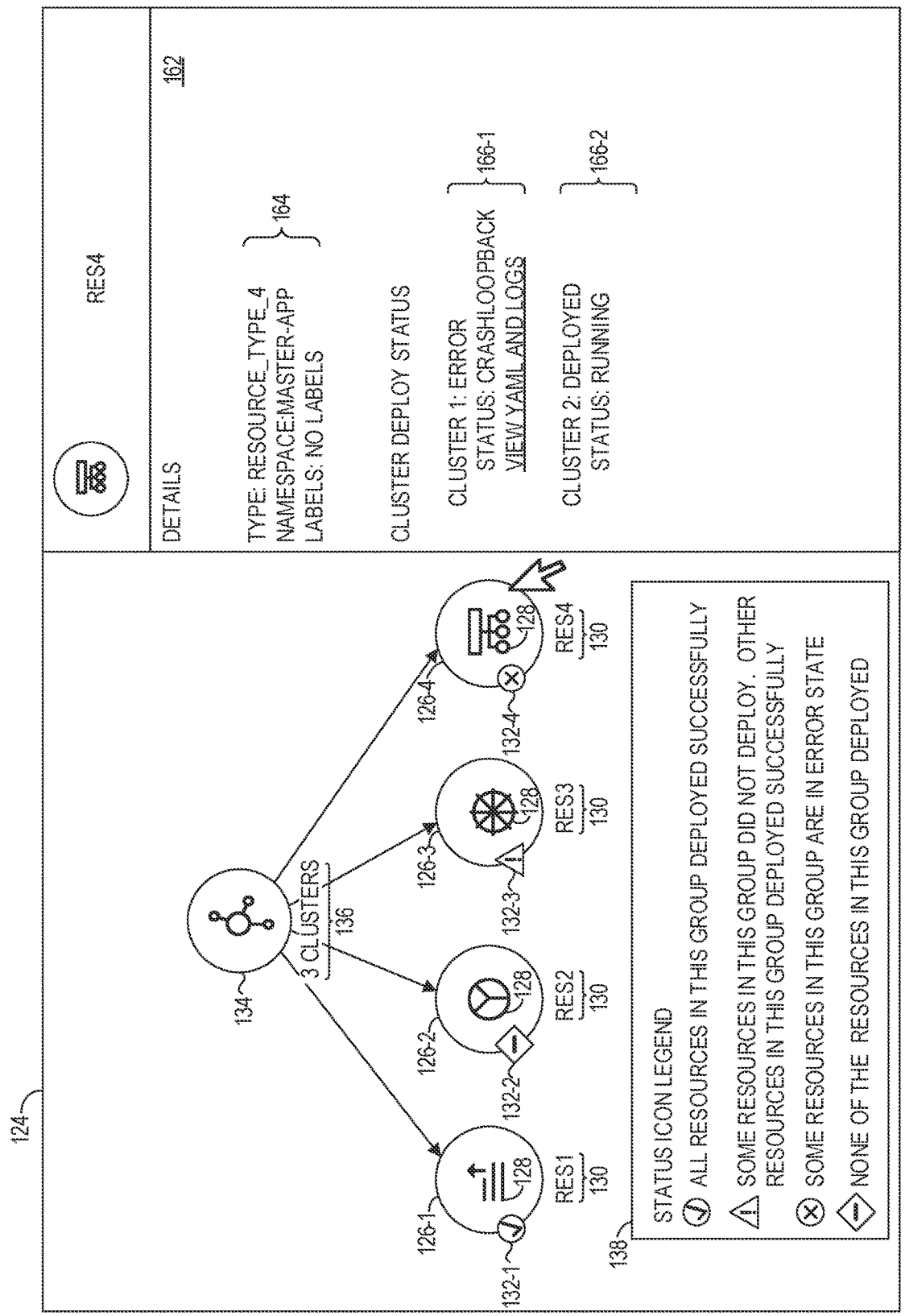

Referring now to FIG. 8E, assume that the operator 122 has selected the resource representation 126-4 to determine detailed information regarding the deployment of the resource 108-4 on the clusters 22 on which the resource 108-4 was to be deployed. In response, the deployment status visualizer 120 generates and includes in the user interface imagery 124 an information area 162 that provides a miscellaneous resource information area 164 that provides certain details about the resource 108-4, such as, by way of non-limiting example, the resource type of the resource 108-4, a namespace of the resource 108-4, and that there are no labels for the resource 108-4.

The deployment status visualizer 120 also generates and includes in the user interface imagery 124 a deployment status information area 166-1 that indicates that the resource 108-4 is deployed, but is in an error state on the cluster 22-1. The deployment status information area 166-1 includes an error reason (crashloopback) and a selectable hyperlink that, if selected, will cause the deployment status visualizer 120 to access and present on the display device 18 the YAML file that corresponds to the resource 108-4 and any relevant log files. The deployment status visualizer 120 also generates and includes in the user interface imagery 124 a deployment status information area 166-2 that indicates that the resource 108-4 is deployed, and in a running state on the cluster 22-2.

Thus, the operator 122 is able to quickly ascertain that there is a problem with the resource 108-4 on the cluster 22-1, knows what the cause of the error is, and can efficiently focus her efforts on resolving the deployment problem. It is noted that the information area 162 may include any other desirable information and or details about the resource 108-4 and or the clusters 22-1 and 22—as appropriate or desired.

The present examples, among other features, implement a mechanism for easily visualizing the resources 108 of the containerized application 28-2 and quickly identify resources 108 that are in an error state, and/or resources 108 that were not deployed on clusters 22 on which the resources were to be deployed. Because only a single resource representation 126 is presented for each resource 108, irrespective of the number of clusters on which the resource 108 is intended to be deployed, the disclosed mechanism is highly scalable, and does not overwhelm the operator 122 irrespective of the number of clusters 22 on which the resources 108 are to be deployed.

Figure 9:
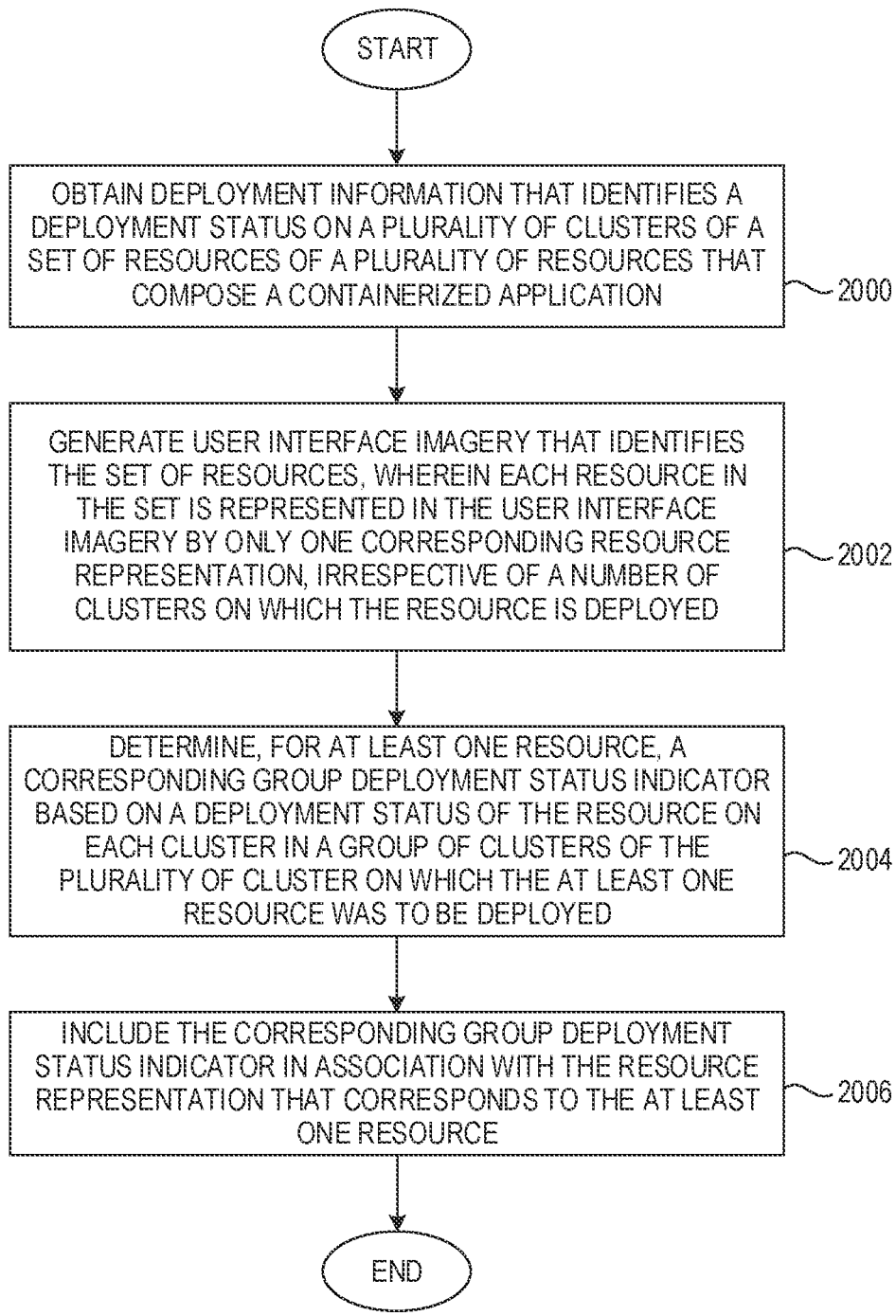
FIG. 9 is a flowchart of a method for implementing a scalable visualization of a containerized application in a multiple-cluster environment according to one implementation.

FIG. 9 is a flowchart of a method for implementing a scalable visualization of a containerized application in a multiple-cluster environment according to one implementation. FIG. 9 will be discussed in conjunction with FIGS. 7 and 8A-8E. The computing device 12 obtains the deployment information 42 that identifies the deployment status on the plurality of clusters 22 of the set of resources 108 that compose the containerized application 28-2 (FIG. 9, block 2000). The computing device 12 generates user interface imagery 124 that identifies the set of resources 108, wherein each resource 108 in the set is represented in the user interface imagery 124 by only one corresponding resource representation 126, irrespective of a number of clusters 22 on which the resource 108 is deployed (FIG. 9, block 2002). The computing device 12 determines, for at least one resource 108, a corresponding group deployment status indicator 132 based on a deployment status of the resource 108 on each cluster 22 in a group of clusters 22 of the plurality of clusters 22 on which the at least one resource 108 was to be deployed (FIG. 9, block 2004). The computing device 12 includes the corresponding group deployment status indicator 132 in association with the resource representation 126 that corresponds to the at least one resource 108 (FIG. 9, block 2006).

Figure 10:
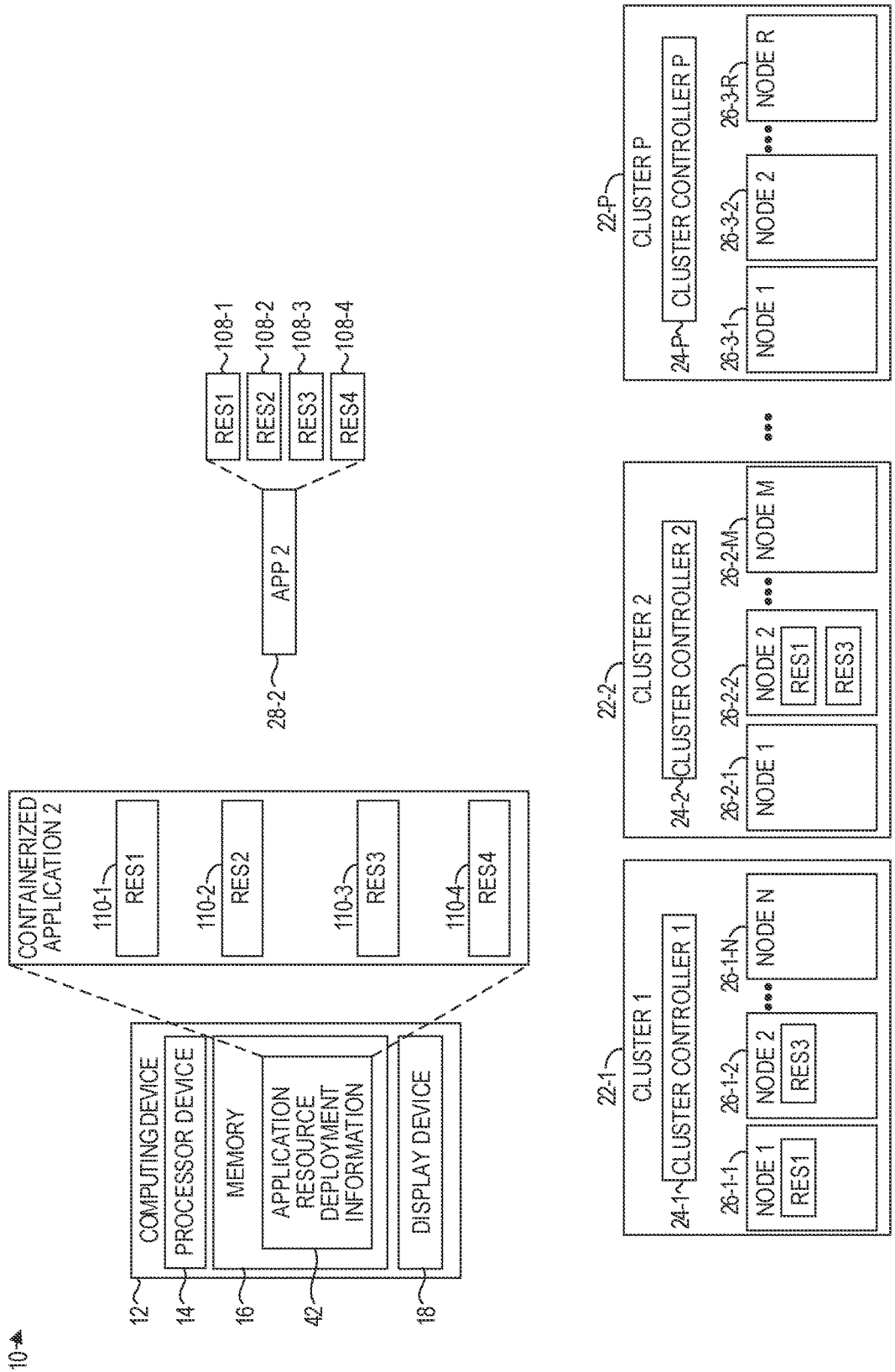
FIG. 10 is a simplified block diagram of the environment illustrated in FIG. 7 according to one example.

FIG. 10 is a simplified block diagram of the environment 10 illustrated in FIG. 7 according to one example. The environment 10 includes the computing device 12, which in turn includes the memory 16 and the processor device 14 coupled to the memory 16. The processor device 14 is to obtain the deployment information 42 that identifies the deployment status on the plurality of clusters 22 of the set of resources 108 that compose the containerized application 28-2. The processor device 14 is further to generate the user interface imagery 124 that identifies the set of resources 108, wherein each resource 108 in the set is represented in the user interface imagery 124 by only one corresponding resource representation 126, irrespective of a number of clusters 22 on which the resource 108 is deployed.

The processor device 14 is further to determine, for at least one resource 108, a corresponding group deployment status indicator 132 based on a deployment status of the resource 108 on each cluster 22 in a group of clusters 22 of the plurality of clusters 22 on which the at least one resource 108 was to be deployed. The processor device 14 is further to include the corresponding group deployment status indicator 132 in association with the resource representation 126 that corresponds to the at least one resource 108.

Figure 11:
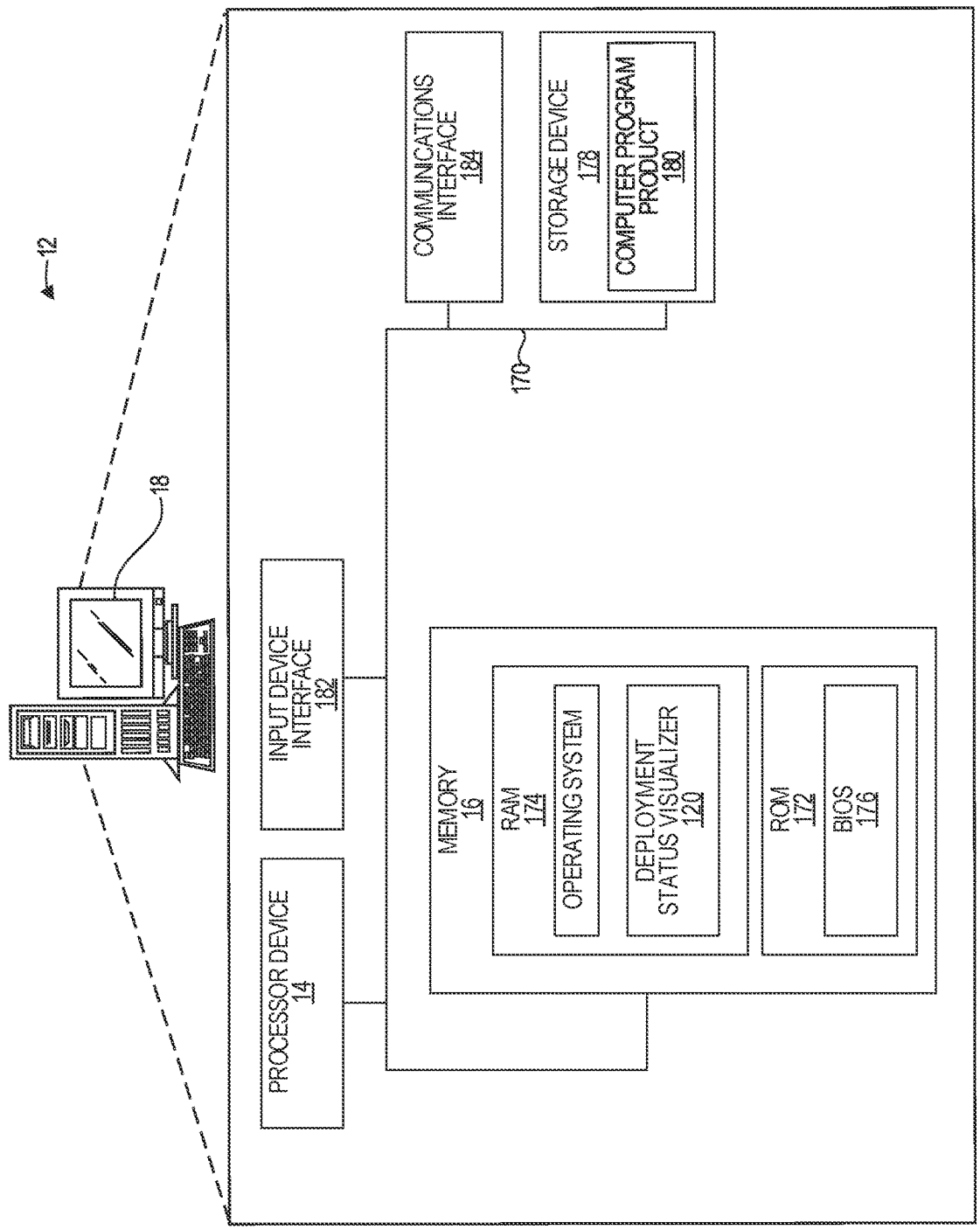
FIG. 11 is a block diagram of the computing device illustrated in FIG. 7 suitable for implementing examples according to one example.

FIG. 11 is a block diagram of the computing device 12 suitable for implementing examples according to one example. The computing device 12 may comprise any computing or electronic device capable of including firmware, hardware, and/or executing software instructions to implement the functionality described herein, such as a computer server, a desktop computing device, a laptop computing device, or the like. The computing device 12 includes the processor device 14, the system memory 16, and a system bus 170. The system bus 170 provides an interface for system components including, but not limited to, the system memory 16 and the processor device 14. The processor device 14 can be any commercially available or proprietary processor.

The system bus 170 may be any of several types of bus structures that may further interconnect to a memory bus (with or without a memory controller), a peripheral bus, and/or a local bus using any of a variety of commercially available bus architectures. The system memory 16 may include non-volatile memory 172 (e.g., read-only memory (ROM), erasable programmable read-only memory (EPROM), electrically erasable programmable read-only memory (EEPROM), etc.), and volatile memory 174 (e.g., random-access memory (RAM)). A basic input/output system (BIOS) 176 may be stored in the non-volatile memory 172 and can include the basic routines that help to transfer information between elements within the computing device 12. The volatile memory 174 may also include a high-speed RAM, such as static RAM, for caching data.

The computing device 12 may further include or be coupled to a non-transitory computer-readable storage medium such as a storage device 178, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 178 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 178 and in the volatile memory 174, including an operating system and one or more program modules, such as the deployment status visualizer 120, which may implement the functionality described herein in whole or in part.

All or a portion of the examples may be implemented as a computer program product 180 stored on a transitory or non-transitory computer-usable or computer-readable storage medium, such as the storage device 178, which includes complex programming instructions, such as complex computer-readable program code, to cause the processor device 14 to carry out the steps described herein. Thus, the computer-readable program code can comprise software instructions for implementing the functionality of the examples described herein when executed on the processor device 14. The processor device 14, in conjunction with the deployment status visualizer 120 in the volatile memory 174, may serve as a controller, or control system, for the computing device 12 that is to implement the functionality described herein.

The operator 122 may also be able to enter one or more configuration commands through a keyboard (not illustrated), a pointing device such as a mouse (not illustrated), or a touch-sensitive surface such as the display device 18. Such input devices may be connected to the processor device 14 through an input device interface 182 that is coupled to the system bus 170 but can be connected by other interfaces such as a parallel port, an Institute of Electrical and Electronic Engineers (IEEE) 1394 serial port, a Universal Serial Bus (USB) port, an IR interface, and the like. The computing device 12 may also include a communications interface 184, such as an Ethernet transceiver, suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:
obtaining, by a computing device comprising a processor device, deployment information that identifies a deployment status on the plurality of clusters of a set of resources of a plurality of resources that compose a containerized application;
generating, by the computing device, first user interface imagery that identifies the set of resources, wherein each resource in the set is represented in the first user interface imagery by only one corresponding resource representation, irrespective of a number of clusters on which the resource is deployed;
determining, by the computing device, for at least one resource, a corresponding group deployment status indicator based on a deployment status of the resource on each cluster in a group of clusters of the plurality of clusters on which the at least one resource was to be deployed;
including, by the computing device, in the first user interface imagery the corresponding group deployment status indicator in association with the corresponding resource representation that corresponds to the at least one resource;
presenting, by the computing device, the first user interface imagery on a display device;
receiving a first user input that selects a first resource representation that is depicted in association with a group deployment status indicator indicating that a resource corresponding to the first resource representation has been successfully deployed on at least one cluster but has not been successfully deployed on each cluster in the group of clusters on which the at least one resource was to be deployed; and
generating second user interface imagery identifying, for each cluster in the group of clusters on which the at least one resource was to be deployed, a status indicating whether the at least one resource was deployed on the cluster.

2. The method of claim 1 further comprising determining, for each respective resource in the set of resources, a corresponding group of clusters of the plurality of clusters on which the respective resource was to be deployed.

3. The method of claim 1 wherein determining, for the at least one resource, the corresponding group deployment status indicator comprises:
   determining, based on the deployment information, that the at least one resource has been successfully deployed on each cluster in the group of clusters; and
   determining the corresponding group deployment status indicator to be an indicator that corresponds to a status wherein the at least one resource has been successfully deployed on each cluster in the group of clusters.

4. The method of claim 1 wherein determining, for the at least one resource, the corresponding group deployment status indicator comprises:
   determining, based on the deployment information, that the at least one resource has been successfully deployed on a first cluster in the group of clusters on which the at least one resource was to be deployed and has not been successfully deployed on a second cluster in the group of clusters; and
   determining the corresponding group deployment status indicator to be an indicator that corresponds to a status wherein the at least one resource has been successfully deployed on one or more clusters in the group of clusters but has not been successfully deployed on each cluster in the group of clusters.

5. The method of claim 1 wherein determining, for the at least one resource, the corresponding group deployment status indicator comprises:
   determining, based on the deployment information, that the at least one resource is in an error state on at least a first cluster of the group of clusters on which the at least one resource was to be deployed; and
   determining the corresponding group deployment status indicator to be an indicator that corresponds to a status wherein the at least one resource is in the error state on one or more clusters of the group of clusters.

6. The method of claim 1 wherein determining, for the at least one resource, the corresponding group deployment status indicator comprises:
   determining, based on the deployment information, that the at least one resource was not successfully deployed on any cluster in the group of clusters on which the at least one resource was to be deployed; and
   determining the corresponding group deployment status indicator to be an indicator that corresponds to a status wherein the at least one resource was not successfully deployed on any cluster in the group of clusters on which the at least one resource was to be deployed.

7. The method of claim 1 further comprising:
   receiving a second user input that selects a second resource representation that is depicted in association with a group deployment status indicator indicating that the resource corresponding to the first resource representation has not been successfully deployed on any cluster in the group of clusters on which the at least one resource was to be deployed; and
   generating third user interface imagery identifying, for each cluster in the group of clusters on which the resource was to be deployed, information indicating that the at least one resource was not deployed on any cluster in the group of clusters.

8. The method of claim 1 further comprising:
   receiving a second user input that selects a second resource representation that is depicted in association with a group deployment status indicator indicating that the resource corresponding to the first resource representation is in an error state on one or more clusters in the group of clusters on which the at least one resource was to be deployed; and
   generating third user interface imagery identifying, for each cluster in the group of clusters on which the resource was to be deployed, status information indicating a status of the at least one resource on the cluster, including, for each of the one or more clusters that are in an error state, information identifying the error state of the resource.

9. The method of claim 1 wherein the first user interface imagery comprises a single cluster representation and identifies a total number of the clusters in the plurality of clusters in association with the single cluster representation.

10. The method of claim 1 wherein obtaining the deployment information that identifies the deployment status on the plurality of clusters of the set of resources comprises:
    requesting from a plurality of cluster controllers, each cluster controller controlling a different cluster of the plurality of clusters and each cluster comprising a plurality of compute nodes, deployment information for the set of resources.

11. A computing device, comprising:
    a memory; and
    a processor device coupled to the memory to:
      obtain deployment information that identifies a deployment status on a plurality of clusters of a set of resources of a plurality of resources that compose a containerized application;
      generate first user interface imagery that identifies the set of resources, wherein each resource in the set is represented in the first user interface imagery by only one corresponding resource representation, irrespective of a number of clusters on which the resource is deployed;
      determine, for at least one resource, a corresponding group deployment status indicator based on a deployment status of the resource on each cluster in a group of clusters of the plurality of clusters on which the at least one resource was to be deployed;
      include in the first user interface imagery the corresponding group deployment status indicator in association with the corresponding resource representation that corresponds to the at least one resource;
      present the first user interface imagery on a display device;
      receive a user input that selects a first resource representation that is depicted in association with a first group deployment status indicator indicating that the resource corresponding to the first resource representation has been successfully deployed on at least one cluster but has not been successfully deployed on each cluster in the group of clusters on which the at least one resource was to be deployed; and
      generate second user interface imagery identifying, for each cluster in the group of clusters on which the at least one resource was to be deployed, a status indicating whether the at least one resource was deployed on the cluster.

12. The computing device of claim 11 wherein the processor device is further to determine, for each respective resource in the set of resources, a corresponding group of clusters of the plurality of clusters on which the respective resource was to be deployed.

13. The computing device of claim 11 wherein to determine, for the at least one resource, the corresponding group deployment status indicator, the processor device is further to:

determine, based on the deployment information, that the at least one resource has been successfully deployed on a first cluster in the group of clusters on which the at least one resource was to be deployed and has not been successfully deployed on a second cluster in the group of clusters; and determine the corresponding group deployment status indicator to be an indicator that corresponds to a status wherein the at least one resource has been successfully deployed on one or more clusters in the group of clusters but has not been successfully deployed on each cluster in the group of clusters.

14. The computing device of claim 11 wherein the processor device is further to:

receive a second user input that selects a second resource representation that is depicted in association with a group deployment status indicator indicating that the resource corresponding to the first resource representation has not been successfully deployed on any cluster in the group of clusters on which the at least one resource was to be deployed; and generate third user interface imagery identifying, for each cluster in the group of clusters on which the resource was to be deployed, information indicating that the at least one resource was not deployed on any cluster in the group of clusters.

15. A non-transitory computer-readable storage medium that includes executable instructions to cause a processor device to:

obtain deployment information that identifies a deployment status on a plurality of clusters of a set of resources of a plurality of resources that compose a containerized application;

generate first user interface imagery that identifies the set of resources, wherein each resource in the set is represented in the first user interface imagery by only one corresponding resource representation, irrespective of a number of clusters on which the resource is deployed;

determine, for at least one resource, a corresponding group deployment status indicator based on a deployment status of the resource on each cluster in a group of clusters of the plurality of clusters on which the at least one resource was to be deployed;

include in the first user interface imagery the corresponding group deployment status indicator in association with the corresponding resource representation that corresponds to the at least one resource;

present the first user interface imagery on a display device;

receive a user input that selects a first resource representation that is depicted in association with a first group deployment status indicator indicating that the resource corresponding to the first resource representation has been successfully deployed on at least one cluster but has not been successfully deployed on each cluster in the group of clusters on which the at least one resource was to be deployed; and generate second user interface imagery identifying, for each cluster in the group of clusters on which the at least one resource was to be deployed, a status indicating whether the at least one resource was deployed on the cluster.

16. The non-transitory computer-readable storage medium of claim 15 wherein to determine, for the at least one resource, the corresponding group deployment status indicator, the instructions further cause the processor device to:

determine, based on the deployment information, that the at least one resource has been successfully deployed on a first cluster in the group of clusters on which the at least one resource was to be deployed and has not been successfully deployed on a second cluster in the group of clusters; and determine the corresponding group deployment status indicator to be an indicator that corresponds to a status wherein the at least one resource has been successfully deployed on one or more clusters in the group of clusters but has not been successfully deployed on each cluster in the group of clusters.

17. The non-transitory computer-readable storage medium of claim 15 wherein the instructions further cause the processor device to:

receive a second user input that selects a second resource representation that is depicted in association with a group deployment status indicator indicating that the resource corresponding to the first resource representation has not been successfully deployed on any cluster in the group of clusters on which the at least one resource was to be deployed; and generate third user interface imagery identifying, for each cluster in the group of clusters on which the resource was to be deployed, information indicating that the at least one resource was not deployed on any cluster in the group of clusters.

* * * * *